(12) United States Patent
Lewis et al.

(10) Patent No.: US 8,981,266 B2
(45) Date of Patent: Mar. 17, 2015

(54) ELECTRICAL APPARATUS

(75) Inventors: Stuart Martin Lewis, Luton (GB); Peter English, Luton (GB)

(73) Assignee: GKN Aerospace Services Limited, East Cowes, Isle of Wight (GB)

( * ) Notice: Subject to any disclaimer, the term of this patent is extended or adjusted under 35 U.S.C. 154(b) by 305 days.

(21) Appl. No.: 13/575,892

(22) PCT Filed: Jan. 31, 2011

(86) PCT No.: PCT/GB2011/000122
§ 371 (c)(1),
(2), (4) Date: Jul. 27, 2012

(87) PCT Pub. No.: WO2011/092480
PCT Pub. Date: Aug. 4, 2011

(65) Prior Publication Data
US 2012/0298653 A1    Nov. 29, 2012

(30) Foreign Application Priority Data
Jan. 29, 2010  (GB) .................................. 1001576.6

(51) Int. Cl.
*H05B 3/03* (2006.01)
*H05B 3/18* (2006.01)
(Continued)

(52) U.S. Cl.
CPC *B64D 15/12* (2013.01); *H05B 3/18* (2013.01); *H05B 2203/016* (2013.01);
(Continued)

(58) Field of Classification Search
None
See application file for complete search history.

(56) References Cited

U.S. PATENT DOCUMENTS

| 2,710,909 | A |   | 6/1955 | Logan et al. |
| 3,973,103 | A | * | 8/1976 | Tadewald ...................... 219/543 |

(Continued)

FOREIGN PATENT DOCUMENTS

| DE | 20 2004 018 910 U1 | 3/2005 |
| GB | 2 453 769 A | 4/2009 |

(Continued)

OTHER PUBLICATIONS

International Search Report and Written Opinion under date of mailing of Aug. 17, 2011 in connection with PCT/GB2011/000122.
(Continued)

*Primary Examiner* — Joseph M Pelham
(74) *Attorney, Agent, or Firm* — Bejin Bieneman PLC

(57) ABSTRACT

Electrical apparatus such as a heater (2) for an ice protection system for an aircraft (1) comprises a laminate such as a heater mat (3) and a connector (41-49). The laminate (3) comprises dielectric layers (50-58) and an electrical element such as a heater element (501), and each dielectric layer of the laminate comprises thermoplastic material. The connector (41-49) comprises a ribbon having first and second ends and a metal conductor (413, 423, 433). The ribbon comprises thermoplastic material and its first end (415, 425, 435, 445, 455, 465, 475, 485) is embedded in the laminate and is laminated to adjacent first and second ones of the dielectric layers (50-58) of the laminate. Because the thermoplastic material of the ribbon is the same as or is compatible with the thermoplastic material of the first and second dielectric layers, the formation of an undesirable discontinuity at the interfaces between the first end of the ribbon and the first and second dielectric layers is prevented. Thus, cracks are less likely to be initiated at the interfaces during the use of the electrical apparatus, and de-lamination is less likely to occur.

27 Claims, 16 Drawing Sheets

(51) Int. Cl.
*H05B 3/36* (2006.01)
*B64D 15/12* (2006.01)

(52) U.S. Cl.
CPC ....... *B64D 2700/62078* (2013.01); *H05B 3/36* (2013.01); *H05B 2203/013* (2013.01); *H05B 2203/017* (2013.01); *H05B 2203/033* (2013.01); *H05B 2214/02* (2013.01)
USPC ............................ 219/541; 219/544; 219/202

(56) References Cited

U.S. PATENT DOCUMENTS

| | | | | |
|---|---|---|---|---|
| 4,029,942 | A | * | 6/1977 | Levin ............................ 219/522 |
| 4,320,286 | A | * | 3/1982 | Borrup .......................... 219/549 |
| 4,755,659 | A | * | 7/1988 | Leon et al. ..................... 219/547 |
| 4,995,835 | A | * | 2/1991 | Cunningham et al. ........ 439/668 |
| 5,314,145 | A | | 5/1994 | Rauckhorst, III |
| 8,110,783 | B2 | * | 2/2012 | Sasaki et al. .................. 219/544 |
| 8,167,192 | B1 | * | 5/2012 | Kim ............................... 228/121 |
| 8,227,036 | B2 | | 7/2012 | Bardwell |
| 8,575,523 | B2 | * | 11/2013 | Chivers et al. ................ 219/549 |
| 2010/0116818 | A1 | * | 5/2010 | Gabbay .......................... 219/528 |
| 2012/0298803 | A1 | * | 11/2012 | English et al. ............ 244/134 D |
| 2012/0298804 | A1 | * | 11/2012 | Lewis et al. ................ 244/134 D |
| 2013/0001211 | A1 | * | 1/2013 | Lewis et al. ................... 219/201 |
| 2013/0092676 | A1 | * | 4/2013 | Offermann et al. ........... 219/203 |
| 2014/0190957 | A1 | * | 7/2014 | Chivers et al. ................ 219/528 |

FOREIGN PATENT DOCUMENTS

| | | |
|---|---|---|
| WO | 95/15670 A1 | 6/1995 |
| WO | WO 2009050460 A1 * | 4/2009 |

OTHER PUBLICATIONS

The State Intellectual Property Office of the People's Republic of China, English Language Translation of the First Office Action, Application No. 201180015166.5, May 5, 2014, 6 pages.

* cited by examiner

ELECTRICAL APPARATUS

CROSS-REFERENCE TO RELATED APPLICATIONS

This application represents the national stage entry of PCT International Application No. PCT/GB2011/000122 filed Jan. 31, 2011, which claims the benefit of Great Britain Application 1001576.6, filed Jan. 29, 2010, both of which are hereby incorporated herein by reference for all purposes.

FIELD OF THE INVENTION

The present invention relates to electrical apparatus such as an electrothermal heater for an electrothermal ice protection system suitable for use in an aircraft or other aerodynamic structure such as a blade of a wind turbine to prevent ice from forming and/or to remove ice that has already formed. These two functions may be termed anti-icing and de-icing, respectively.

BACKGROUND OF THE INVENTION

For an aircraft, the in-flight formation of ice on the external surface of the aircraft is undesirable. The ice destroys the smooth flow of air over the aircraft surface, increases drag and decreases the ability of an aerofoil to perform its intended function.

Also, built-up ice may impede the movement of a movable control surface such as a wing slat or flap. Ice which has built up on an engine air inlet may be suddenly shed in large chunks which are ingested into the engine and cause damage.

It is therefore common for aircraft, and particularly commercial aircraft, to incorporate an ice protection system. A commercial aircraft may use a system which involves bleeding hot air off from the engines, and the hot air is then ducted to the airframe components such as the leading edges of the wing and the tail which are prone to ice formation. More recently, electrically powered systems have been proposed, such as in EP-A-1,757,519 (GKN Aerospace) which discloses a wing slat having a nose skin which incorporates an electrothermal heater blanket or mat. The heater mat is bonded to the rear surface of a metallic erosion shield which comprises the forwardly-facing external surface of the nose skin.

The heater mat is of the "Spraymat" (trade mark) type and is a laminated product comprising dielectric layers made of preimpregnated glass fibre cloth and a heater element formed by flame spraying a metal layer onto one of the dielectric layers. The "Spraymat" has a long history from its original development in the 1950s by D. Napier & Sons Limited (see their GB-833,675 relating to electrical de-icing or anti-icing apparatus for an aircraft) through to its subsequent use by GKN Aerospace.

A recent "Spraymat" produced by GKN Aerospace for use in a wing slat is formed on a male tool and involves laying up a stack of plies comprising (i) about 10 layers of glass fibre fabric preimpregnated with epoxy cured in an autoclave, (ii) a conductive metal layer (the heater element) which has been flame sprayed onto the laminate using a mask to form the heater element pattern and (iii) a final 3 or so layers of the glass fibre fabric. Wiring is soldered to the heater element to permit connection to the aircraft's power system. The heater mat is then cured in an autoclave.

The wiring that connects the heater element to a power supply and control unit is typically a foil, mesh or wire that is encapsulated within a polyimide film and is embedded within the laminate during the curing in the autoclave. Polyimide film is a thermoplastic and is deliberately chosen so as not to merge with the surrounding laminate. In fact, polyimide is more usually used as a release or parting film within a laminate in order to introduce a discontinuity into a laminate. Thus, when the polyimide film is embedded in the laminate of the heater mat, it provides a discontinuity in the heater mat at which cracks may be initiated.

It would be desirable to provide an improved technique for embedding a connector in a laminated product.

SUMMARY OF THE INVENTION

According to a first aspect of the present invention, there is provided electrical apparatus comprising a laminate and a connector, wherein:
- the laminate comprises dielectric layers and an electrical element;
- each dielectric layer of the laminate comprises thermoplastic material;
- the connector comprises a ribbon having first and second ends and a metal conductor;
- the first end of the ribbon comprises thermoplastic material, is embedded in the laminate and is laminated to adjacent first and second ones of the dielectric layers of the laminate;
- the metal conductor of the connector is electrically connected to the electrical element of the laminate;
- the second end of the ribbon extends away from the laminate for connection to an electrical unit;
- the thermoplastic material of the first end of the ribbon is (i) the same as the thermoplastic material of the first dielectric layer of the laminate such that the thermoplastic material of the first end of the ribbon is dispersed or merged into the thermoplastic material of the first dielectric layer of the laminate or (ii) compatible with the thermoplastic material of the first dielectric layer of the laminate such that the thermoplastic material of the first end of the ribbon is fused to the thermoplastic material of the first dielectric layer of the laminate; and
- the thermoplastic material of the first end of the ribbon is (i) the same as the thermoplastic material of the second dielectric layer of the laminate such that the thermoplastic material of the first end of the ribbon is dispersed or merged into the thermoplastic material of the second dielectric layer of the laminate or (ii) compatible with the thermoplastic material of the second dielectric layer of the laminate such that the thermoplastic material of the first end of the ribbon is fused to the thermoplastic material of the second dielectric layer of the laminate.

In our current embodiments, the laminate is a heater mat and the electrical element is a heater element, a temperature sensor or a conductive ground plane. However, the present invention has broader application than just to heater mats and such types of electrical elements.

For example, the laminate could be part of a lightning protection system for an aircraft, and the electrical element could be a sprayed conductive ground plane which is connectable to an aircraft earth by the ribbon connector. It is also envisaged that the present invention could find application in the automotive industry. For example, a laminated thermoplastic product for incorporation in a vehicle such as an electric vehicle could use the ribbon connector to simplify and improve the reliability of the electrical connection to the rest of the electrical system of the vehicle.

Because the thermoplastic material of the first end of the ribbon is the same as or is compatible with the thermoplastic material of the first dielectric layer and is the same as or is compatible with the thermoplastic material of the second dielectric layer, the formation of an undesirable discontinuity at the interfaces between the first end of the ribbon and the first dielectric and second dielectric layers is substantially prevented or minimised. Thus, cracks are less likely to be initiated at the interfaces during the use of the electrical apparatus, and de-lamination is less likely to occur. In other words, the structural or fatigue strength is improved.

If the same thermoplastic material is used for the first end of the ribbon and all of the dielectric layers, the lamination can be performed such that there are substantially no discontinuities between any of the thermoplastic components of the laminate. This gives the thermoplastic of the laminate a monolithic structure which will resist de-lamination during use.

If the thermoplastic material of the first end of the ribbon is not the same as that of the first or second dielectric layer and is merely compatible with the material of the first or second dielectric layer, then the compatibility can be achieved by selecting the thermoplastic of the first end of the ribbon such that it is not necessary to use adhesive to bond it to the thermoplastic of the first or second dielectric layer during the lamination. The dissimilar but compatible materials will bond to one another at the interface by one thermoplastic material (e.g. PEEK) fusing to but not dispersing into the other thermoplastic material (e.g. PEKK) when the stack of assembled components is heated to above the melt point of one of the abutting thermoplastic materials.

The laminate comprises at least two dielectric layers in the form of the first and second dielectric layers, but the dielectric layers may be greater in number. For example, the laminate may comprise at least 3, 4 or 5 dielectric layers.

In our current embodiments, the electrical element is a sprayed metal coating which is porous. This is advantageous because the adjacent thermoplastic material is able to migrate into or through the porous coating during the lamination operation, thereby reducing the risk of subsequent de-lamination.

In our current embodiments, the ribbon comprises a substrate layer, the first end of the ribbon is provided by a first end of the substrate layer and the substrate layer extends from the first end to the second end of the ribbon. For example, a strip may be cut out from a dielectric sheet made of the thermoplastic material that is to be used for the connector, and the strip may be cut to have a length corresponding to the desired length of the connector. Substrate layers may be manufactured in batches by cutting a corresponding number of strips out of a single dielectric sheet.

In a preferred embodiment, the ribbon further comprises an encapsulation layer and the conductor is sandwiched between the substrate layer and the encapsulation layer. Thus, the encapsulation layer serves to protect the conductor. Preferably, the encapsulation layer does not cover the first end of the substrate layer. This can make it easier to connect an exposed end of the conductor to the electrical element. Preferably, the encapsulation layer comprises the same thermoplastic material as the substrate layer and is laminated to the substrate layer. The encapsulation layer may be arranged so that it abuts but does not enter into the laminate.

In our current embodiments, the embedded first end of the ribbon covers 10% or less of a main surface of the first or second dielectric layer onto which the first end of the ribbon is laminated. The coverage may be 5% or less, 2% or less, or 1% or less. For example, when the laminate is an electrothermal heater mat and the heater mat is of a size to suit a commercial aircraft, the coverage is likely to be 1% or less.

In our current embodiments, the metal conductor of the connector is a sprayed metal track. Spraying such as flame spraying permits efficient deposition of a metal track on thermoplastic material. Flame spraying will produce a porous metal track and this porosity allows adjacent thermoplastic material to migrate into or through the metal track during lamination.

In our current embodiments, the sprayed metal track includes a terminal at the first end of the ribbon and the electrical element of the laminate includes a terminal which is in electrical contact with the terminal at the first end of the ribbon. For example, the terminals may be soldered or welded together.

Alternatively, a metal plug may be attached to the sprayed metal track at the first end of the ribbon and the metal plug protrudes into a hole in the first or second dielectric layer of the laminate and is electrically connected to the electrical element.

In some of our current embodiments, the connector has a single metal conductor. Other embodiments have a plurality of metal conductors such as two parallel sprayed metal tracks.

In our current embodiments, we use high-temperature engineering thermoplastic. Our preferred material comprises PEEK, PEKK, PPS, PEI or PES or a mixture thereof. These materials are able to withstand flame spraying of a sprayed metal track without significant damage. We particularly prefer PEEK and PEKK.

Preferably, the first end of the ribbon and the dielectric layers all comprise the same thermoplastic material. This optimises the strength of the lamination of the components when the stack of assembled components is heated up and pressed together to form the laminate.

The electrical apparatus may comprise a plurality of said connectors and the laminate may comprises a plurality of said electrical elements. Each electrical element is electrically connected to the metal conductor(s) of the or each of a respective one or plurality of the connectors.

In our current embodiments, the laminate is a heater mat for an ice protection system and the electrical element or at least one of the electrical elements is a heater element. In an ice protection system, the second end of the ribbon of the connector or at least one of the connectors is connected to a heater control unit. In ice protected apparatus, the heater mat is in thermal contact with a rear surface of the external skin.

According to a second aspect of the present invention, there is provided a method of manufacturing electrical apparatus, comprising the steps of:

providing an electrical element and a plurality of dielectric layers each comprising thermoplastic material;

flame spraying a metal track onto thermoplastic material of a substrate layer of a connector;

forming a stack comprising the dielectric layers, the electrical element and a first end of the substrate layer of the connector, with the first end of the substrate layer being positioned between first and second ones of the dielectric layers, a second end of the substrate layer being positioned outside the stack and the metal track of the connector being electrically connected to the electrical element; and laminating together the dielectric layers and the first end of the substrate layer such that the thermoplastic material of the first end of the substrate layer disperses or merges into or is fused to the thermoplastic material of the first dielectric layer and such that the thermoplastic material of the first end of the substrate layer disperses or merges into or is fused to the thermoplastic material of the second dielectric layer.

The electrical element may be a heater element, a temperature sensor or a conductive ground plane which is flame sprayed onto the thermoplastic material of one of the dielectric layers.

BRIEF DESCRIPTION OF THE DRAWINGS

Specific embodiments of the present invention will now be described, by way of example only, with reference to the accompanying drawings in which:—

Figure 1:
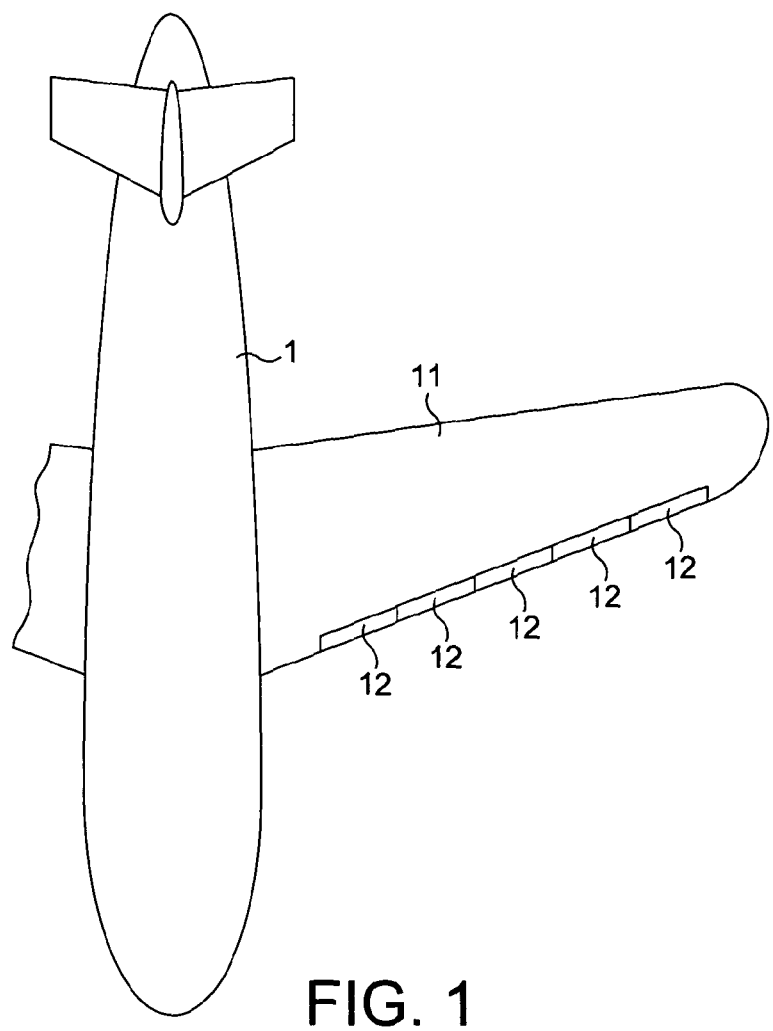
FIG. 1 is a diagrammatic plan view of an aircraft having slats in the leading edge of a wing.

While the invention is susceptible to various modifications and alternative forms, specific embodiments are shown by way of example in the drawings and are herein described in detail. It should be understood, however, that the drawings and detailed description of the specific embodiments are not intended to limit the invention to the particular forms disclosed. On the contrary, the invention is cover all modifications, equivalents and alternatives falling within the spirit and the scope of the present invention as defined by the appended claims.

DESCRIPTION OF SPECIFIC EMBODIMENTS

FIG. 1 is a plan view of an aircraft 1 having a wing 11 along the leading (forward) edge of which are positioned five wing slats 12. Each wing slat 12 incorporates an electrothermal ice protection system.

Figure 2:
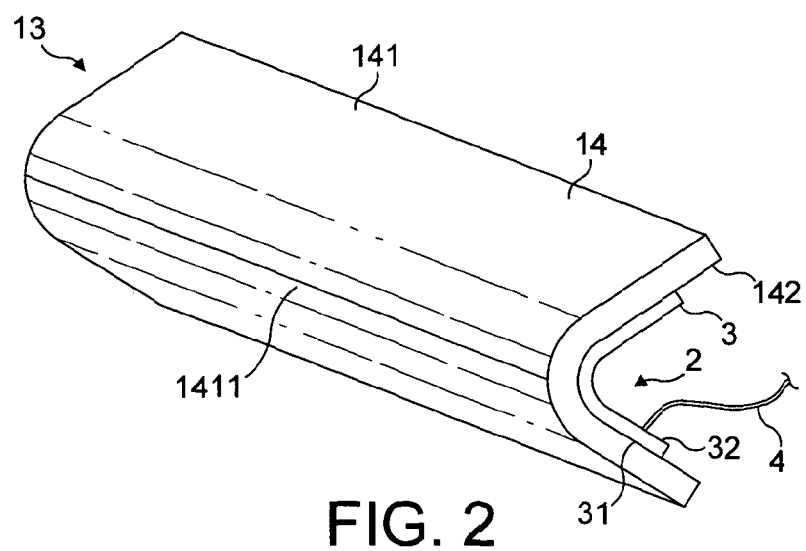
FIG. 2 is a diagrammatic perspective view of a nose skin of a wing slat of FIG. 1.

FIG. 2 is a diagrammatic perspective view of a demountable nose skin 13 of one of the wing slats 12 of FIG. 1. The configuration of the nose skin 13 may be generally the same as in EP-A-1,757,519 (GKN Aerospace) which discloses a wing slat having a demountable forward section comprising a nose skin.

The nose skin 13 comprises an erosion shield 14 and an electrically-powered heater 2.

The heater 2 comprises a heater blanket or mat 3 and a bundle of connectors 4 which connect the heater mat 3 to the power supply and control electronics of the aircraft 1.

The erosion shield 14 is generally rectangular and has a front surface 141 which is convexly curved and a rear surface 142 which is concavely curved. An apex 1411 of the front surface 141 provides the leading edge of the aircraft wing 11.

The heater mat 3 is generally rectangular and has a front surface 31 which is convexly curved and a rear surface 32 which is concavely curved. The convex front surface 31 conforms to the shape of and is bonded to the rear surface 142 of the erosion shield 14. In this way, thermal energy generated as the heater mat 3 is operated passes, by conduction, into the erosion shield 14 in order to provide an ice protection function. The erosion shield 14 is metallic and may be made of aluminium (which is the usual material) or titanium (which is expensive but may offer some functional and processing benefits). An important function of the erosion shield 14 is to protect the aircraft against lightning strikes by absorbing and dissipating the lightning current.

The demountable nose skin 13 is convenient because just the nose skin may be removed from the main or rear section of the wing slat 12 to enable the nose skin to be repaired or replaced if it has been damaged, or to enable maintenance to be performed on the heater 2.

If the heater 2 has developed a fault, the nose skin 13 may be demounted from the main or rear section of the wing slat 12 by, for example, undoing or releasing releasable securing means such as screws. The heater 2 may then be inspected and tested. If possible, the heater 2 is repaired in situ. If this is not possible, the heater mat 3 is removed from the erosion shield 14 of the nose skin 13 and a heater mat of a new heater is secured to (e.g. bonded or glued onto) the erosion shield 14. The nose skin 13 is then ready to be returned to service. Whilst the old nose skin is being repaired, a new nose skin taken from stock may be fitted to the wing slat 12 to keep the aircraft in flying condition.

An assembly process for producing a heater mat in accordance with the first embodiment of the present invention will now be described with reference to FIGS. 3-19 which depict, in a very diagrammatic manner, the components of the heater mat and how they are assembled together to produce the heater mat and how the heater mat is then bonded to an erosion shield.

The components shown in FIGS. 3-19 are very diagrammatic. For example, in relation to the dielectric layer 50 shown in FIG. 3, the thickness has been exaggerated for the sake of clarity.

Also, the width and length of the layer have been reduced for the sake of clarity. In a practical embodiment, the dielectric layer would be generally rectangular and would be a sheet having a width ranging typically from 0.25 m to 1 m and a length ranging from typically 1 m to 4 m. In use, the width of the sheet will usually wrap around the chord at the leading edge of the wing, and the length of the sheet will usually extend along the span of the wing. The dielectric sheet (the dielectric layer) would also typically have a thickness of 0.05 mm to 2 mm.

The dielectric layer 50 is made from a high-temperature engineering thermoplastic or from a reinforcement material (such as glass fibres) which is impregnated with the high-temperature engineering thermoplastic.

From the class of high-temperature engineering thermoplastics, we currently use: PEEK (polyether ether ketone), PEKK (polyetherketoneketone), PPS (polyphenylene sulphide), PEI (polyetherimide) or PES (polyethersulphone) or mixtures thereof. These materials have been selected based on the requirement for a suitable glass transition temperature and suitable thermal fatigue performance. PEEK and PEKK are particularly preferred because PEEK has the necessary mechanical performance and is particularly receptive to a flame sprayed metal coating, and PEKK has similar properties but is easier to bond to the metal material.

The other components of the heater mat (to be described later) are each selected to be made from a material the same as or compatible with the material of the dielectric layer 50 so that, when the components are laminated together at the end of the assembly process, the components can merge or fuse together so that the heater mat is monolithic. This means that the laminated components of the heater mat will not delaminate from one another. Because of the absence of discontinuities between discrete layers, it is not possible for cracks to initiate at the (former) boundaries between adjacent substrate layers, and this improves the fatigue resistance of the heater mat.

Figure 3:
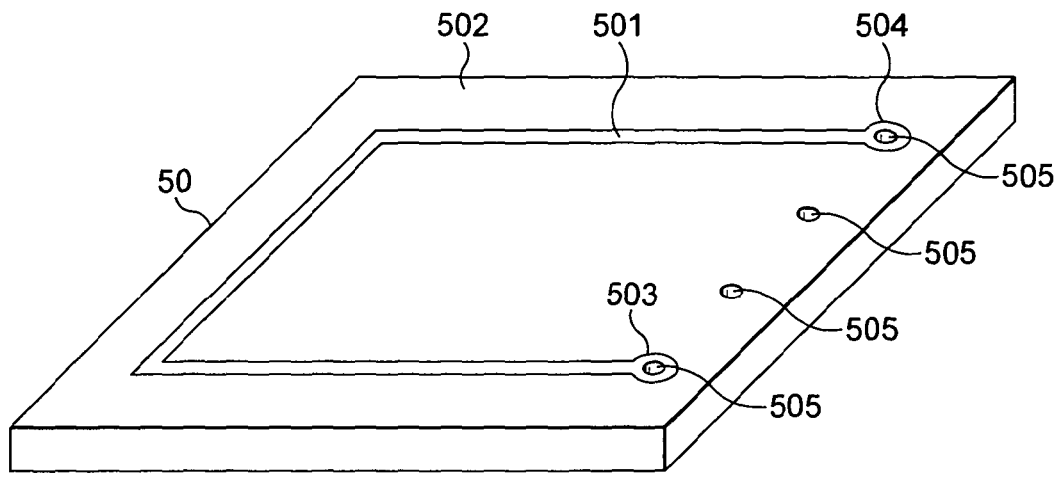
FIG. 3 is a diagrammatic perspective view of a dielectric layer at a first stage of an assembly process for producing a heater mat in accordance with a first embodiment of the present invention.

FIG. 3 shows that the track of a heater element 501 has been laid down on the upper main surface 502 of the dielectric substrate layer 50. The heater element 501 extends from a first terminal 503 to a second terminal 504. The heater element 501 is shown in FIG. 3 as having a simple "C" shape. In practice, it will have a more complicated shape such as a shape that repeatedly zigzags from the first terminal 503 to the second terminal 504. The heater element 501 is shown in FIG. 3 as having a simple shape for the sake of clarity of the diagrammatic depiction.

Figure 5:
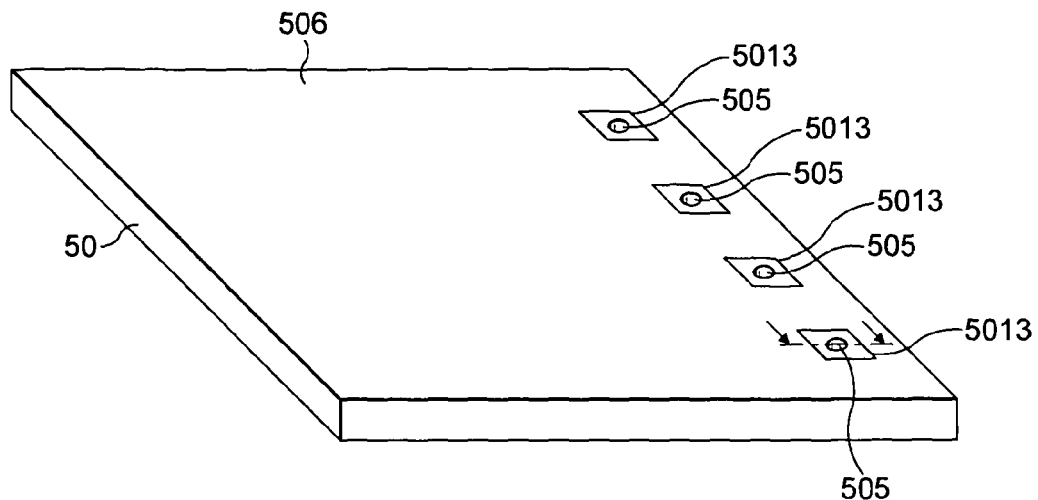
FIG. 5 is a diagrammatic perspective view of the dielectric layer of FIG. 4 at a third stage of the assembly process.

The dielectric layer 50 has four through holes 505 which extend from the upper main surface 502 through to a lower main surface 506 (see FIG. 5). A mask is used to flame spray the track of the heater element 501 onto the upper main surface 502 of the dielectric layer 50 so that the track runs from the first terminal 503 to the second terminal 504. The heater element 501 is made of a resistive metal such as copper or metal alloy such as a copper-manganese alloy. Flame or hot metal spraying is a well-established technique dating back many years, for example back to GB-833,675 (D. Napier & Sons Limited) which relates to hot metal spraying various metal layers of an electrical de-icing or anti-icing apparatus for an aircraft, and the reader is referred to GB-833,675 which is incorporated herein by reference. The spraying is performed so that the heater element 501 is porous, with the degree of porosity depending on the number of passes of the spraying gun and the thickness of the metal coating that forms the heater element 501. A suitable spraying gun is the Mark 66E-Man produced by Metallisation Limited of Dudley, West Midlands, United Kingdom in combination with its associated control equipment.

The through holes 505 are formed before the flame spraying of the heater element 501. Each hole has a typical diameter of 3.5 mm, but may range from 1 to 6 mm in diameter, more preferably 2 to 5 mm in diameter, or 3 to 4 mm in diameter. During the flame spraying, some of the material of the heater element 501 is sprayed down into the two holes 505 at the first and second terminals 503, 504.

Figure 4:
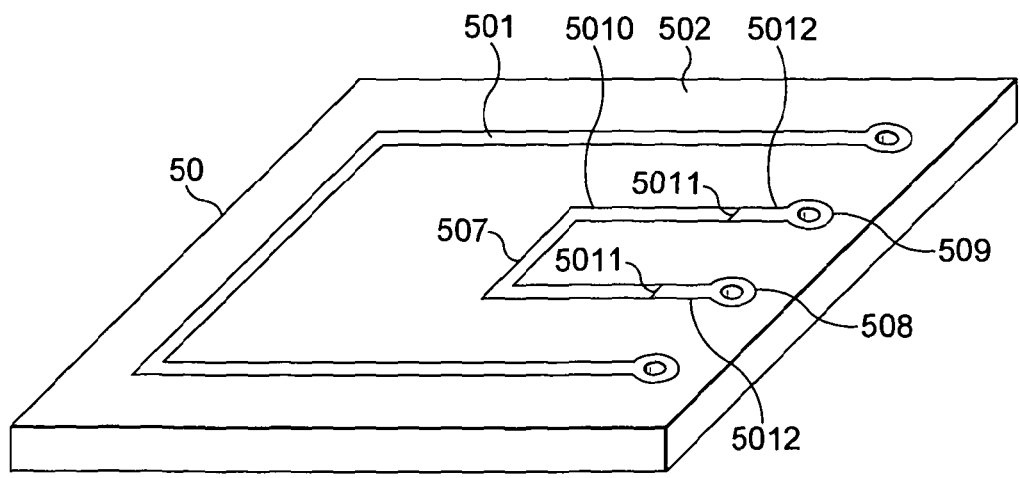
FIG. 4 is a diagrammatic perspective view of the dielectric layer of FIG. 3 at a second stage of the assembly process.

The next stage of the assembly process is shown in FIG. 4. A mask is used to flame spray an area temperature sensor 507 onto the upper main surface 502. Thus, the temperature sensor 507 is present on the same substrate layer as the heater element 501. The track of the temperature sensor 507 extends from a first terminal 508 to a second terminal 509. Each of the terminals 508, 509 is located at a respective through hole 505. During the flame spraying, some of the material of the temperature sensor 507 is sprayed down into the two holes 505 at the terminals 508, 509.

The area temperature sensor 507 is used as part of a control loop to provide temperature control and thermal-damage-prevention information to a control unit for the heater 2. The temperature sensor 507 is a resistance temperature device (RTD) sensor. The flame spraying lays down a conductive metal track having a suitable temperature coefficient of resistance. Suitable metals include nickel and nickel-based alloys, although any metal with a high temperature coefficient of resistance could be used as long as it is suited to being applied by a flame spraying process. The conductive metal coating may be used to form the entirety of the temperature sensor 507 from the first terminal 508 to the second terminal 509. Alternatively, as shown in FIG. 4, the conductive metal coating with the suitable temperature coefficient of resistance may be flamed sprayed to form a sensor head 5010 located between two intermediate boundaries 5011 on the track of the sensor 507. Leads 5012 may be flamed sprayed from the boundaries 5011 to the terminals 508, 509 so as to connect the sensor head 5010 to the terminals 508, 509. The leads 5012 may be a conductive metal such as copper.

The next stage of the assembly process is shown in FIG. 5. It involves turning over the dielectric layer 50 so that the lower main surface 506 is facing upwards. Then, a mask is used to spray conductive metal (e.g. copper) or alloy to form terminals or contact pads 5013 around the through holes 505. During this flame spraying, some of the material of the terminal 5013 coats the bore of each through hole 505. This is more clearly shown in FIG. 6 which is a cross-sectional view taken on the section line in FIG. 5. The heater element 501 is shown in FIG. 6 as having a generally cylindrical projection 5014 which extends into the through hole 505 from the main surface 502 and forms a radially outer coating inside the through hole 505.

The terminal 5013 is shown as having a generally cylindrical projection 5015 which extends into the hole 505 from the main surface 506 and forms a radially inner coating of the through hole 505.

Figure 6:
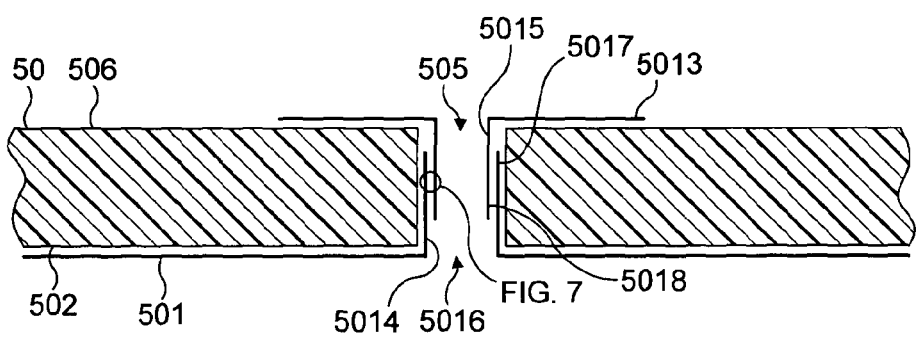
FIG. 6 is a diagrammatic cross-sectional view taken on the section line in FIG. 5.

In FIG. 6, the cylindrical projection 5015 of coating material is shown as leaving the hole 505 as having a through bore 5016. If the coating thickness of the terminal 5013 and its projection 5015 is sufficiently thick, and/or if the diameter of the through hole 505 is sufficiently small, it is possible that the projection 5015 will occlude or block the radially inner part of the through hole 505 so as to form a central plug. Under these circumstances, there would be no through bore 5016 after the two coatings 501, 5013 have been applied.

As shown in FIG. 6, the free end 5017 of the coating projection 5014 extends beyond the free end 5018 of the coating projection 5015. Thus, the projection 5014 overlaps the projection 5015 within the hole 505. The free end 5017 is shown as stopping short of the main surface 506, but it could extend substantially to the main surface 506 and even sometimes extend slightly onto the main surface 506. This might occur, for example, if the sheet of dielectric material forming the layer 50 is positioned on the table of a metal spraying machine and the sheet vibrates during the flame spraying. This vibration would facilitate a "through plating" effect where the sprayed metal passes all the way through the hole 505 and carries on slightly to coat the far surface 506 around the hole 505.

Similarly, the coating projection 5015 of the terminal 5013 is shown as having its free end 5018 stopping short of the main surface 502. The flame spraying or other application process could be arranged to ensure that the free end 5018 extends substantially to the main surface 502 or, perhaps, even extends round onto part of the main surface 502 adjacent to the through hole 505. Of course, under these circumstances, the heater element 501 would be interposed between the free end 5018 and the main surface 502.

Because of the overlap between the free end 5017 and the free end 5018, there is a continuous conductive path between the main surface 502 and the main surface 506. This is true of each of the through holes 505 which is subjected to the "spray plating" from both ends to form a continuous through connection.

In order to achieve a satisfactory through connection, it is beneficial for the dielectric layer to have a thickness in the range of 0.05 mm to 2 mm.

Figure 7:
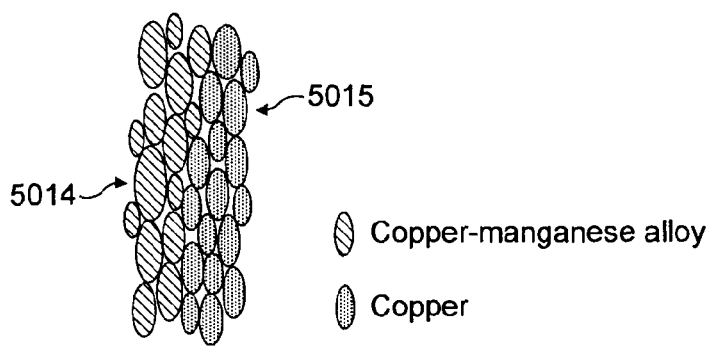
FIG. 7 is a diagrammatic enlargement of the circled area of FIG. 6.

FIG. 7 is a diagrammatic enlargement of the circled area in FIG. 6 and shows the overlap between the two coatings forming the projections 5014, 5015. The flame spraying produces a coating having particles with a mean diameter typically between 30-150 μm. Also, each coating 5014, 5015 forms a microporous conductor. The particles of the coatings at the interface between the projection 5014 and the projection 5015 are in intimate contact in order to form a good electrical connection between the heater element 501 and the terminal 5013.

Figure 8:
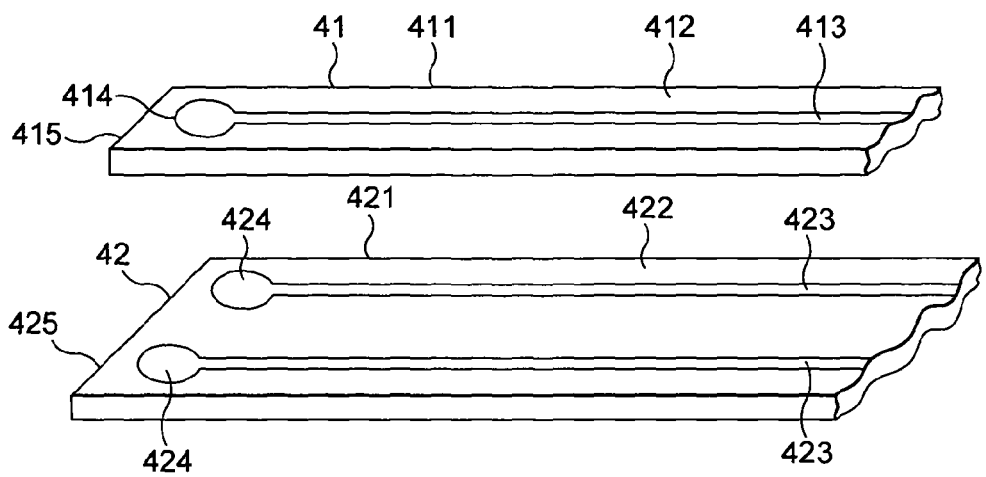
FIG. 8 is a diagrammatic perspective view of two connectors for use in the assembly process.

FIG. 8 shows two connectors 41, 42 which comprise part of the bundle of connectors 4 shown in FIG. 2 and which are used to electrically connect the heater mat 3 to the power supply and control electronics unit 6 (see FIG. 33) of the aircraft 1.

Each of the connectors 41, 42 comprises a dielectric substrate layer 411, 421 which is a strip having the desired length for the connector to perform its connection function.

Each substrate layer 411, 421 is made of high-temperature engineering thermoplastic which is the same as or compatible with the materials of the other component dielectric layers and connectors of the heater 2 so that, when at the end of the assembly process the components of the heater are laminated together, the substrate layers 411, 421 will satisfactorily disperse into the adjacent dielectric layer(s) and/or connector(s) so that the components of the heater form a satisfactory monolithic unit without having to use glue to connect the dielectric substrate layers and connectors together.

Thus, the currently preferred materials for the dielectric substrate layer 411 or 421 are PPS, PEI, PEKK, PEEK and PES. Of these materials, we currently particularly prefer PEKK or PEEK. These materials are particularly good at ensuring that the components of the heater 2 will fuse or bond together to become monolithic and will not delaminate.

Preferably, each substrate layer 411, 421 is made of the same thermoplastic material as the other components as this helps to ensure that the stack of assembled components will disperse or merge into one another to form the monolithic unit when the thermoplastic material is heated to above its melt point and pressure is applied to the stack.

If the material of each substrate layer 411, 421 is not the same as that of the other components and is merely compatible with the material of the other components, then the compatibility can be achieved by selecting the thermoplastic of the substrate layers 411, 421 such that it is not necessary to use adhesive to bond it to the thermoplastic of the other components in the stack during the lamination. The dissimilar but compatible materials will bond to one another at each interface by one thermoplastic material (e.g. PEEK) fusing to but not dispersing into the other thermoplastic material (e.g. PEKK) when the stack of assembled components is heated to above the melt point of one of the abutting materials.

After a sheet of dielectric material has been cut to form the ribbon-like substrate layers 411, 421 a mask is then used to flame spray a conductive metal (e.g. copper) or metal alloy onto a main surface 412, 422 so as to lay down power or signal tracks. In the case of the connector 41, a power track 413 is laid down in the longitudinal direction of the dielectric strip 411 and terminates in a terminal 414 at an end 415 of the connector 41.

In the case of the connector 42, flame spraying is used to lay down the two generally-parallel signal tracks 423 each of which terminates at a terminal 424 at an end 425 of the connector 42.

The other end of each of the tracks 413, 423 may be terminated in any suitable manner for connection to the power supply and control electronics unit 6.

Figure 9:
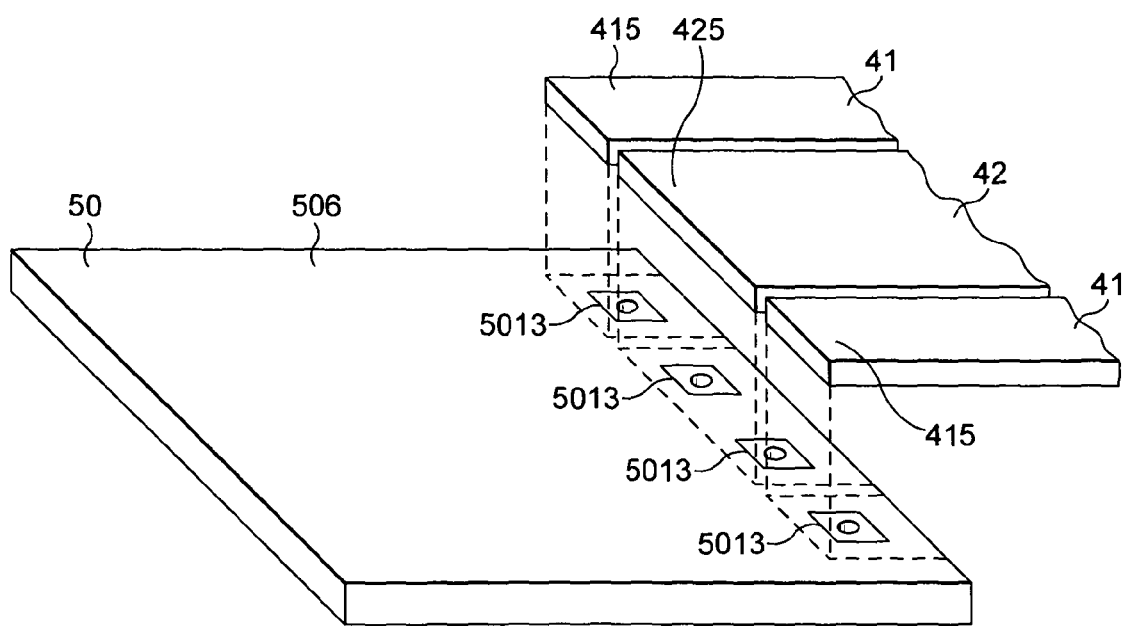
FIG. 9 is a diagrammatic perspective view of the dielectric layer of FIG. 5 at a fourth stage of the assembly process when being assembled with connectors of the type shown in FIG. 8.

FIG. 9 shows the next stage of the assembly process. In this stage, the dielectric layer 50 of FIG. 5 is assembled with two connectors 41 and a single connector 42. The three connectors 41, 42 are positioned, as shown in FIG. 9, with their terminals 414, 424 facing downwards towards the terminals 5013 of the dielectric layer 50. The terminals 414, 424 are then welded or soldered to the terminals 5013.

In this way, the two connectors 41 are connected to the ends of the heater element 501 so that the heater element 501 can be powered by the power supply and control electronics unit 6 via the connectors 41. The ends of the temperature sensor 507 are connected via the connector 42 to the power supply and control electronics unit 6.

Figure 10:
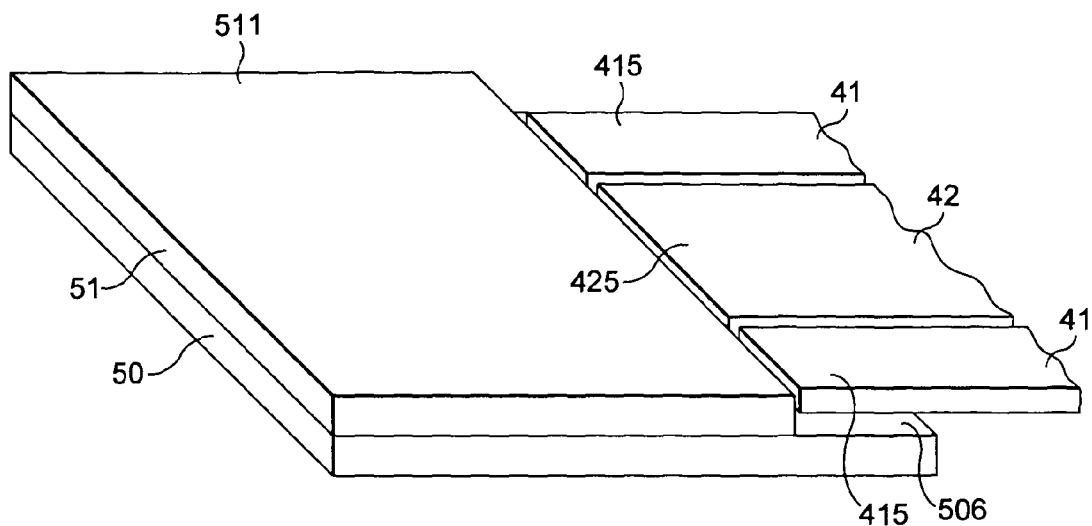
FIG. 10 is a diagrammatic perspective view of the partially-assembled heater mat of FIG. 9 at a fifth stage of the assembly process after being assembled with a further dielectric layer.

FIG. 10 shows the next stage of the assembly process. The partially-assembled heater mat of FIG. 9 has a further dielectric layer 51 positioned on the main surface 506 of the dielectric layer 50. The dielectric layers 50, 51 are made of the same material, such as PEEK or PEKK. In FIG. 10, the dielectric layer 51 does not cover the ends 415, 425 of the connectors 41, 42 but it could be arranged to cover the ends so that the dielectric layer 51 is generally the same size and shape as the dielectric layer 50. During lamination at the end of the assembly process, the increased thickness of dielectric material at the ends 415, 425 will be, at least partially, dispersed or spread out as a result of the heat and pressure applied during lamination. Furthermore, in the finished heater mat 3, it does not matter if, to some extent, the end product (the laminated product) is locally slightly thicker in places as a result of an increased thickness of dielectric material being present.

Figure 11:
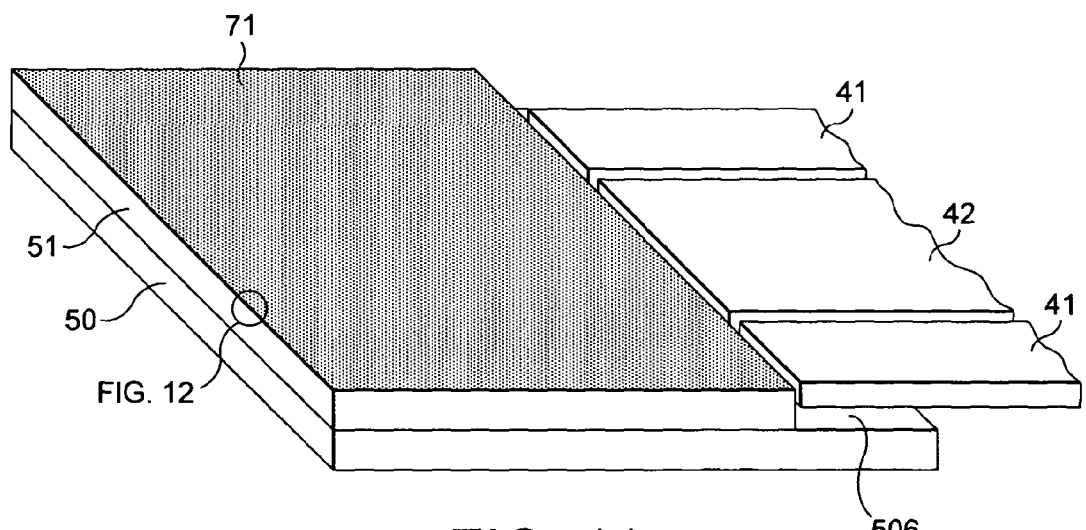
FIG. 11 is a diagrammatic perspective view of the partially-assembled heater mat of FIG. 10 at a sixth stage of the assembly process after being flame sprayed with a copper ground plane.

The next stage of the assembly process is shown in FIG. 11. In this stage, a ground plane 71 is flame sprayed onto the upper main surface 511 of the dielectric layer 51 of the partially-assembled heater mat of FIG. 10. The ground plane comprises flame sprayed copper or copper alloy and is typically 0.05 mm thick, but may range from 0.01 mm to 0.5 mm in thickness, or from 0.03 mm to 0.2 mm in thickness. The exact thickness can be chosen depending on the conductivity that is required.

The purpose of the ground plane 71 is to detect a fault current caused by a heater fault in the heater element 501. For example, the fault could be damage such as heater burn-out. The ground plane 71 is connected to the aircraft earth 143 (see FIG. 19) as well as to the power supply and control electronics unit 6, so that when a fault occurs the unit 6 detects a change in current.

Figure 12:
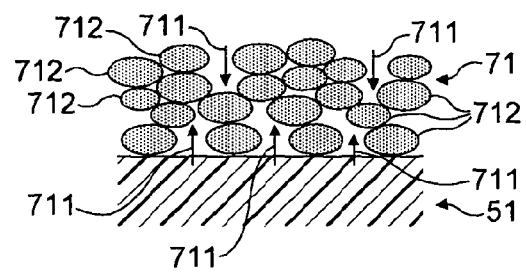
FIG. 12 is a diagrammatic cross-sectional enlargement of the circled area of FIG. 11 and shows the interface between the ground plane and the dielectric layer on which the ground plane has been sprayed.

FIG. 12 is a diagrammatic cross-sectional enlargement of the circled area of FIG. 11 and shows the interface between the ground plane 71 and the dielectric layer 51 onto which the ground plane has been sprayed. The particles of the ground plane 71 are micro-porous so that, during the heating and pressing of the lamination process, the thermoplastic of the adjacent dielectric layers will pass or migrate through the ground plane 71 as part of giving a monolithic structure to the heater mat 3. This migration is indicated by the arrows 711 which show migration paths between the particles 712 of the ground plane 71. Note that, in FIG. 12, only some of the particles 712 are labelled for clarity. The particles 712 are randomly positioned as a result of the spraying and have a random range of sizes with the mean diameter typically ranging from 30-150 μm.

Figure 13:
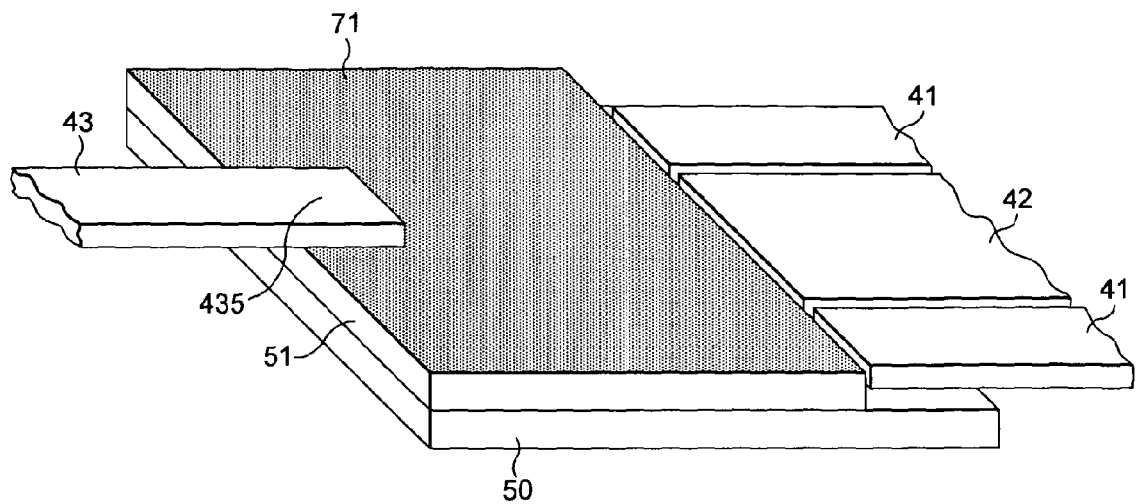
FIG. 13 is a diagrammatic perspective view of the partially-assembled heater mat of FIG. 11 at a seventh stage of the assembly process after a connector of the type shown in FIG. 8 has been connected to the ground plane.

The next stage of the assembly process is shown in FIG. 13. In this stage, a connector 43, which is the same as connector 41, is electrically connected to the ground plane 71 of the partially-assembled heater mat of FIG. 11. The connector 43 has a track 433 on its bottom surface which terminates at a terminal, and that terminal is welded or soldered to the ground plane 71. In this way, the ground plane 71 is electrically connected via the connector 43 to the power supply and control electronics unit 6.

Figure 14:
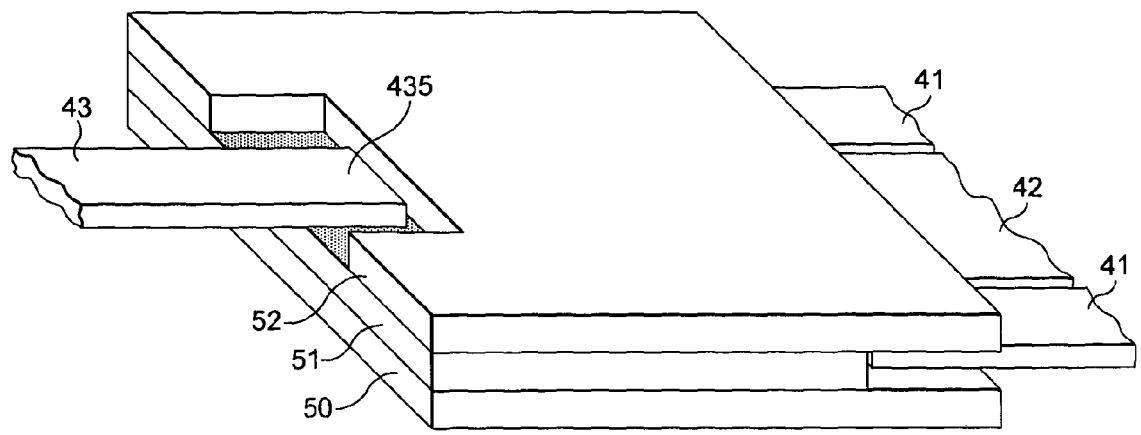
FIG. 14 is a diagrammatic perspective view of the partially-assembled heater mat of FIG. 13 at an eighth stage of the assembly process after a further dielectric layer has been added.

The next stage of the assembly process is shown in FIG. 14. A dielectric layer 52 is laid on top of the ground plane 71 of the partially-assembled heater mat of FIG. 13. The dielectric layer 52 is made of the same material as the dielectric layers 50, 51. It is shown as having a cutout in the region of the connector 43. However, the dielectric layer 52 could be the same size and shape as the dielectric layer 50 such that it would cover the end 435 of the connector 43.

Figure 15:
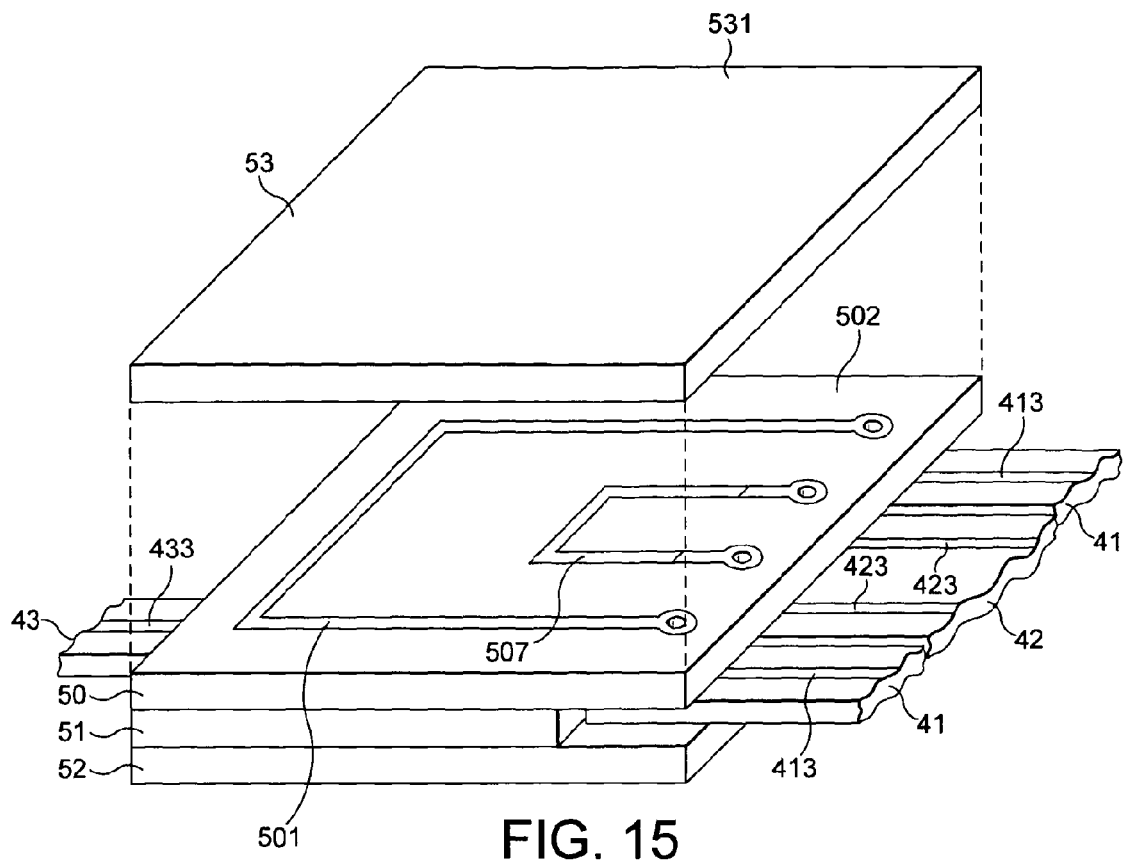
FIG. 15 is a diagrammatic perspective view of the partially-assembled heater mat of FIG. 14 at a ninth stage of the assembly process after a further dielectric layer has been added.

The next stage of the assembly process is shown in FIG. 15. The partially-assembled heater mat of FIG. 14 is turned upside down and a further dielectric layer 53 is positioned on the main surface 502 of the dielectric layer 50. The dielectric layer 53 is the same size and shape as the dielectric layer 50 and it is made of the same material as the other dielectric layers 50, 51 and 52. In FIG. 15, it is possible to see the tracks 413 of the connectors 41, the tracks 423 of the connector 42, and the track 433 of the connector 43.

Figure 16:
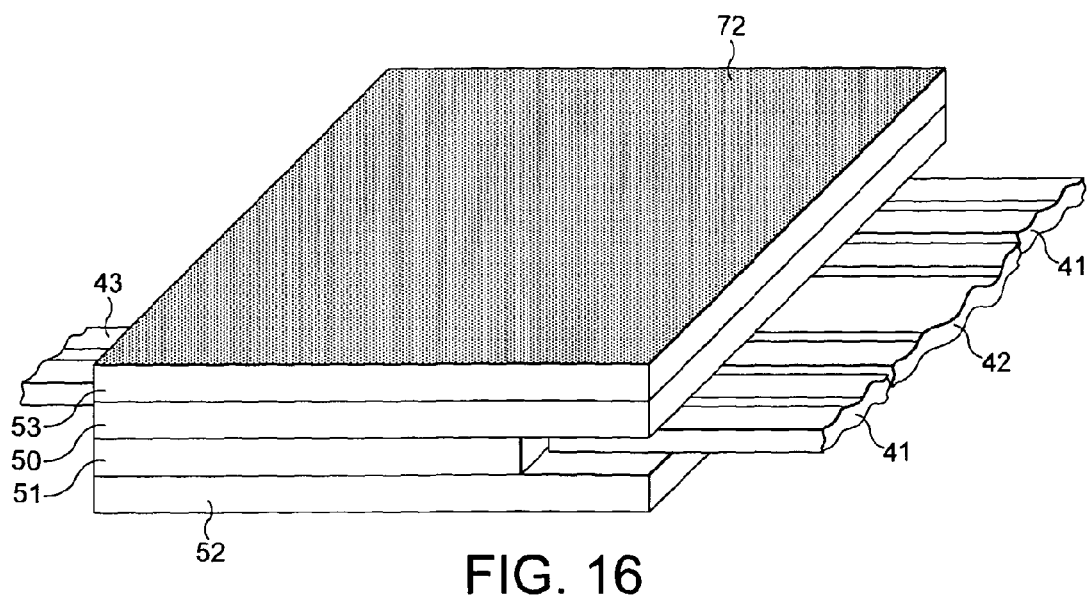
FIG. 16 is a diagrammatic perspective view of the partially-assembled heater mat of FIG. 15 at a tenth stage of the assembly process after the flame spraying of a second ground plane.

The next stage of the assembly process is shown in FIG. 16. In this stage, the partially-assembled heater mat of FIG. 15 has a second ground plane 72 flame sprayed onto the exposed main surface 531 of the dielectric layer 53. The characteristics of the second ground plane 72 are the same as those of the first ground plane 71. In particular, it is preferable that the ground planes 71, 72 should be flame sprayed copper.

Figure 17:
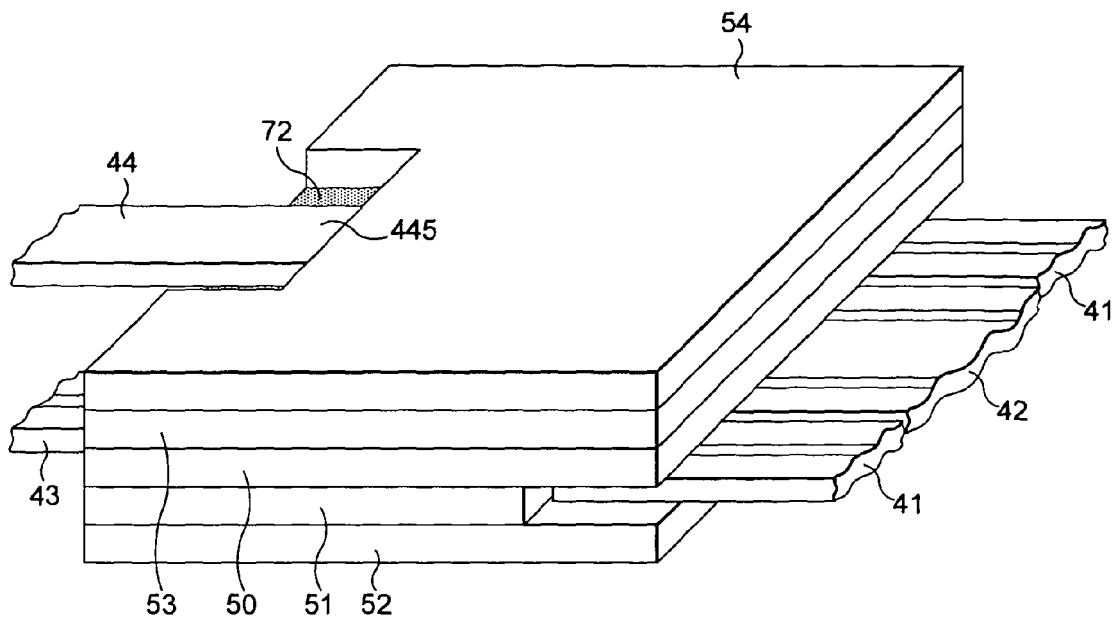
FIG. 17 is a diagrammatic perspective view of the partially-assembled heater mat of FIG. 16 at an eleventh stage of the assembly process after a further dielectric layer and a connector of the type shown in FIG. 8 have been added.

The next stage of the assembly process is shown in FIG. 17. In this stage, a further dielectric layer 54 is positioned on top of the ground plane 72 of the partially-assembled heater mat of FIG. 16. The dielectric layer 54 is made of the same material as the other dielectric layers 50, 51, 52, 53. A connector 44 is generally the same as the connector 41 and has, on it undersurface in FIG. 17, a track leading to a terminal at the end 445 of the connector 44. This terminal of the connector 44 is electrically connected to the second ground plane 72 by welding or soldering so as to establish an electrical connection between the ground plane 72 and the power supply and control electronics unit 6.

Collectively, the connectors 41, 42, 43, 44 comprise the bundle of connectors 4 which is diagrammatically shown in FIG. 2.

In FIG. 17, the dielectric layer 54 is shown as having a cutout around the end 445 of the connector 44. An alternative would be for the layer 54 to omit the cutout, such that the layer 54 has the same rectangular shape and size as the underlying dielectric layer 53. This would mean that the dielectric layer 54 would cover the end 445 of the connector 44. This might result, after lamination, in a slight local increase in thickness of the heater mat in the vicinity of the end 445.

During the laying up of the dielectric layers, reinforcement material may be included in the stack of components of the heater mat. The reinforcement material would be fibrous and examples of the reinforcement material include glass fibres, e.g. either as a uni-directional tape or as a woven fabric, which would be porous to the adjacent thermoplastic dielectric layers during the lamination process. Any reinforcement would need to be non-conductive in order to preserve the insulation provided by the dielectric layers. Also, the reinforcement material should be selected to be as thin as possible.

In FIG. 17, all of the components of the heater mat 3 are in position ready to be laminated together. The lamination process is diagrammatically illustrated in FIG. 18. Heat and pressure are applied to the stack of components so as to consolidate the laminate into a monolithic structure. The result is that the dielectric layers and the embedded ends of the connectors, all being made of the same or compatible engineering thermoplastics, disperse into one another, and the dielectric layers and the ends of the connectors merge or fuse together to become monolithic. Consequently, the layers and the ends of the connectors will not delaminate as a result of the presence of a discontinuity at an interface caused by thermoplastic material which is incompatible and has not merged with the adjacent thermoplastic material. During the lamination, the embedded ends of the connectors effectively become part of the heater mat.

Lamination may be performed using a conventional autoclave, heated press or large laminating machine. Such machinery can be used to heat the stack of components to above the melt point of the thermoplastic material whilst applying pressure, in order to consolidate the laminate.

If reinforcement material is present in the stack of components, the pressure of the lamination process presses the reinforcement material into the thermoplastic of the adjacent layers to form a reinforced thermoplastic laminate. If the reinforcement material is a woven fabric, care should be taken to ensure that the treatments applied to it during the weaving and finishing processes are compatible with lamination temperatures in the order of 400° C.

The intention of the lamination process is to minimise or eliminate discontinuities in the resulting laminate. The end product in the form of the heater mat 3 with the embedded ends of the bundle of connectors 4 has a monolithic structure which can undergo generally uniform expansion as it is heated up. This reduces the thermomechanical stresses on the heater mat 3. This is an important consideration in view of the fact that the thermomechanical stresses are greater than the aerodynamic stresses that the heater mat 3 experiences when installed in the aircraft 1.

In conventional laminated products, glue is used and glue is a weak point at the interfaces between adjacent layers of the laminate. In a conventional heater where the dielectric layers are glued together in the laminate, the glued interfaces are where delamination can occur under fatigue loadings.

Figure 18:
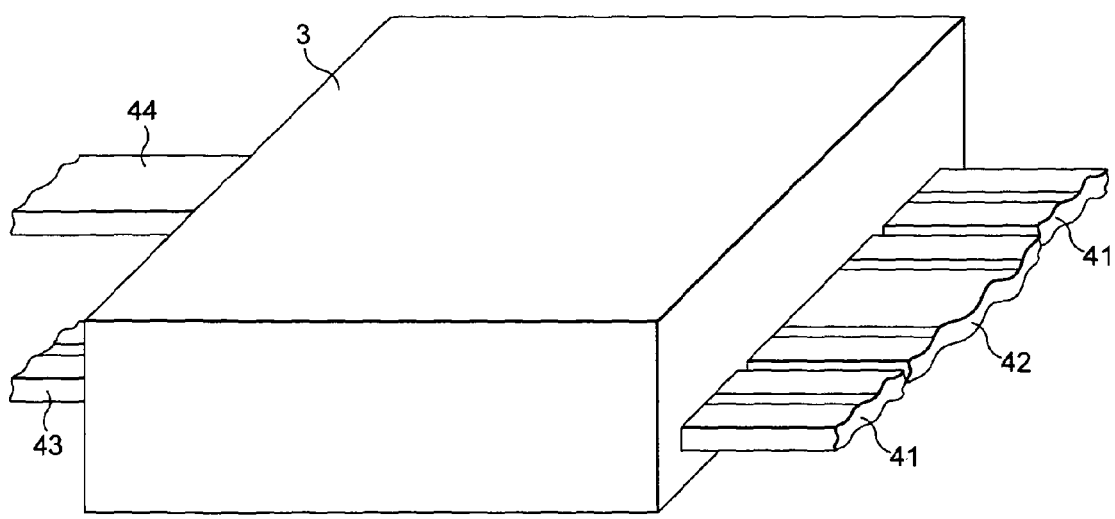
FIG. 18 is a diagrammatic perspective view of the heater mat of FIG. 17 at a twelfth stage of the assembly process after the assembled components of the heater mat have been laminated together.

An advantage of the heater mat of the first embodiment of the present invention as shown in FIG. 18 is that it is glue free. Specifically, glue is not used to laminate together the dielectric layers and the embedded ends of the connectors.

Figure 19:
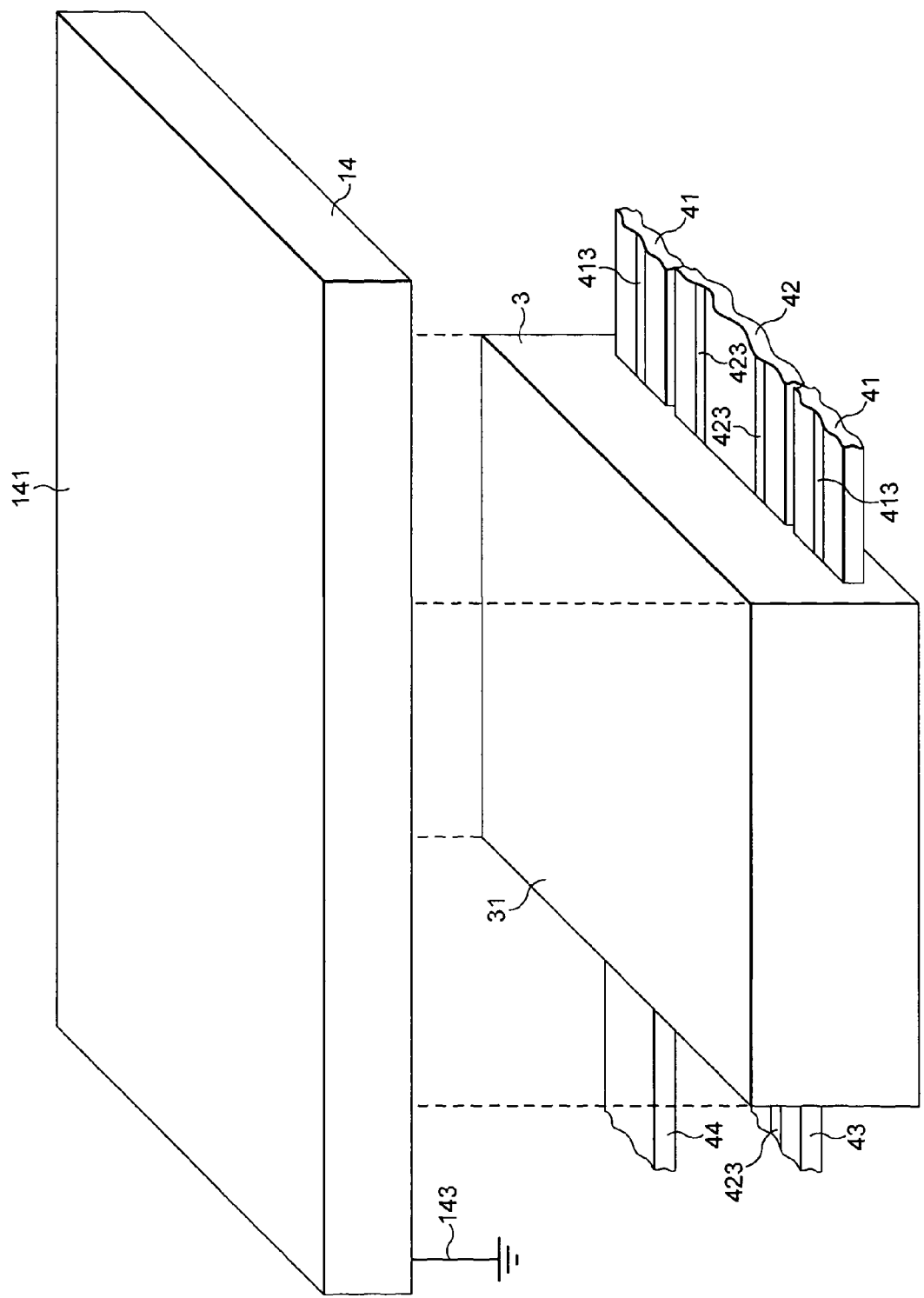
FIG. 19 is a diagrammatic perspective view showing the heater mat of FIG. 18 being bonded to an erosion shield.

FIG. 19 shows how the heater mat 3 is offered up to the rear surface 142 of the erosion shield 14. A suitable adhesive is used to glue or bond the front surface 31 of the heater mat 3 to the rear surface 142 of the erosion shield 14. For ease of illustration, in FIG. 19 the heater mat 3 and the erosion shield 14 are shown as being planar. In an actual representative installation such as shown in FIG. 2, the front surface 31 is convexly curved and the rear surface 142 is correspondingly concavely curved. The heater mat 3 resembles a large sheet which is comparatively long and wide relative to its thickness, and thus the heater mat 3 is flexible and may be easily bent to conform to the shape of the rear surface 142 of the erosion shield 14.

When the heater mat 3 has been installed behind the erosion shield 14, and when the nose skin 13 is being fitted onto the aircraft 1, the connectors 41, 42, 43 and 44 (which collectively form the bundle of connectors 4) may be connected to the power supply and control electronics unit 6 of the aircraft 1. Thus, the heater 2 is now ready for use.

In the first embodiment of the heater mat as discussed above with reference to FIGS. 3-19, it is the case that the heater mat incorporates two ground planes (ground plane 71 and ground plane 72). When the aircraft 1 is struck by lightning on the erosion shield 14, a very large direct current (e.g. 200,000 amps) of a very short duration is dissipated to an aircraft earth 143 by the erosion shield 14. The very large current flowing in the erosion shield during the lightning strike will induce a current in any underlying parallel conductor as a result of electromagnetic coupling. Such parallel conductors include the heater element 501 and the temperature sensor 507. If the heater element 501 and the temperature sensor 507 are not adequately shielded from the electromagnetic coupling, the current that is induced in them may be of the order of 1,000 amps and this current might pass along the bundle of connectors 4 to the power supply and control electronics unit 6. The result could be a current surge in the power supply and control electronics unit 6, which is only designed to cope with currents in the order of 10 amps. A current surge is undesirable as it might damage the electronics inside the unit 6.

In relation to a conventional heater mat with a single ground plane, some current will be induced in the ground plane and will pass to the aircraft earth.

In the heater mat 3 of the first embodiment of the present invention, as disclosed with referenced to FIGS. 3-19, it is the case that the heater mat 3 incorporates two ground planes 71, 72. These ground planes 71, 72 are positioned above and below the heater element 501 and the temperature sensor 507 so that the heater element 501 and temperature sensor 507 are "electromagnetically shielded" by the two ground planes 71, 72. This shielding is, rather similar to the concept of coaxial shielding in a cable.

The ground planes generally have a low resistance. Because the two ground planes sandwich the vulnerable heater element 501, the temperature sensor 507 and the embedded ends of the connection bundle 4 which are connected to the heater element 501 and the temperature sensor 507, they shield those components and the induced current during a lightning strike is preferentially induced in the two ground planes 71, 72 and passes to the aircraft earth 143. Much-reduced currents are induced in the heater element 501, the temperature sensor 507 and the embedded ends of the connection bundle which lead away from the heater element 501 and the temperature sensor 507, thereby reducing the risk of damage to the electronics in the power supply and control electronics unit 6.

There will now be described an alternative build process. Specifically, FIGS. 20-28 illustrate the relevant aspects of an alternative assembly process for producing a heater mat in accordance with the second embodiment of the present invention. FIGS. 20-28 illustrate only those aspects of the build process that differ from what is shown in FIGS. 3-19 in relation to the first embodiment of the present invention.

Figure 20:
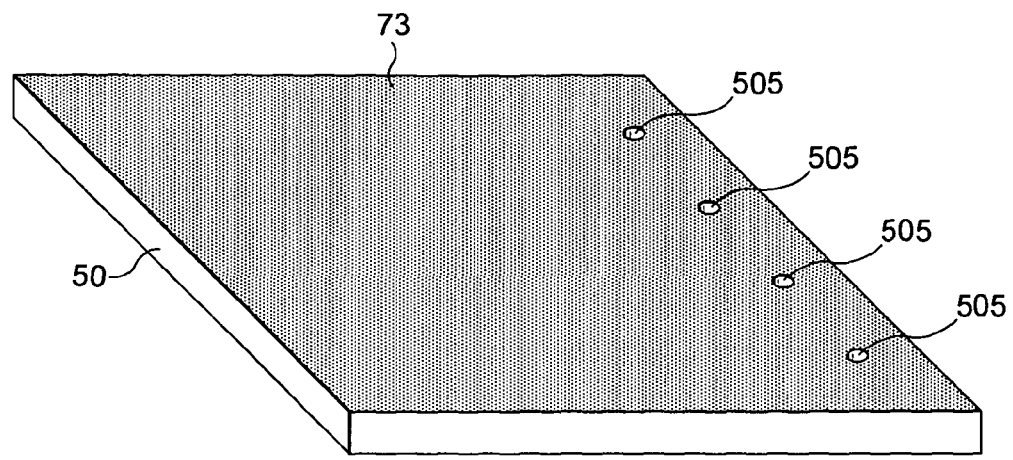
FIG. 20 is a diagrammatic perspective view of an intermediate stage of an alternative assembly process for producing a heater mat in accordance with a second embodiment of the present invention.

Thus, in FIG. 20, the second embodiment takes the dielectric layer 50 of FIG. 4 of the first embodiment and turns it upside down, and then a ground plane 73 is flamed sprayed onto the main surface 506 of the dielectric layer 50 such that the ground plane 73 has the same characteristics as the ground plane 71.

Figure 21:
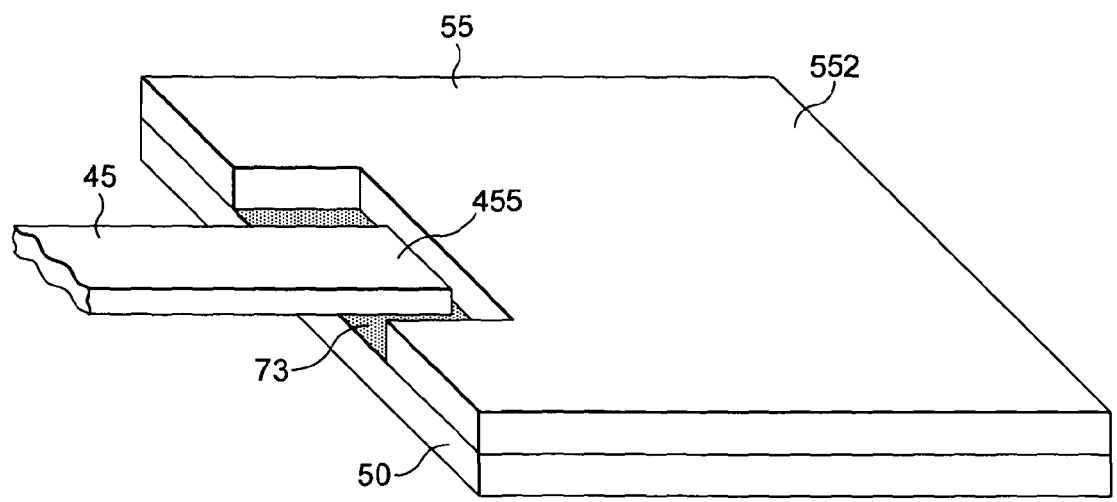
FIG. 21 is a diagrammatic perspective view of the partially-assembled heater mat of FIG. 20 at a subsequent stage of the alternative assembly process.

Then, in the next stage of this alternative assembly process of the second embodiment, a dielectric layer 55 is positioned on top of the ground plane 73 (see FIG. 21). The dielectric layer 55 is made of the same material as the dielectric layer

50. A connector 45 (which corresponds to the connector 43 of the first embodiment) is electrically connected to the ground plane 73. The dielectric layer 55 has a cutout around the end 455 of the connector 45, but this cutout may be omitted and the dielectric layer 55 may have the same size and shape as the dielectric layer 50 such that the dielectric layer 55 covers the end 455.

Figure 22:
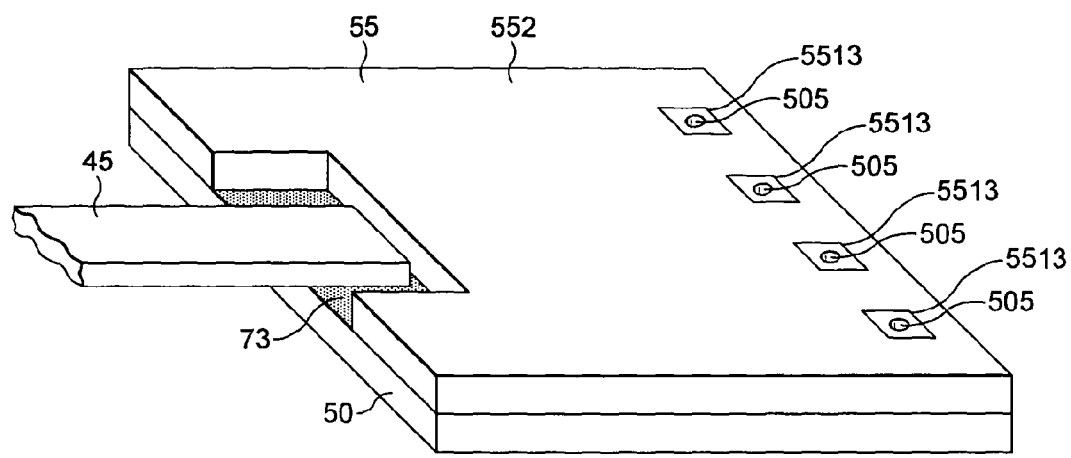
FIG. 22 is a diagrammatic perspective view of the partially-assembled heater mat of FIG. 21 at a subsequent stage of the alternative assembly process.

The next stage of the assembly process of the second embodiment is shown in FIG. 22. The through holes 505 of the dielectric layer 50 are extended through the ground plane 73 and the dielectric layer 55. Terminals or contact pads 5513 are then flamed sprayed onto the upper main surface 552 of the dielectric layer 55, with the terminals 5513 of the second embodiment having the same characteristics as the terminals 5013 of the first embodiment.

Figure 23:
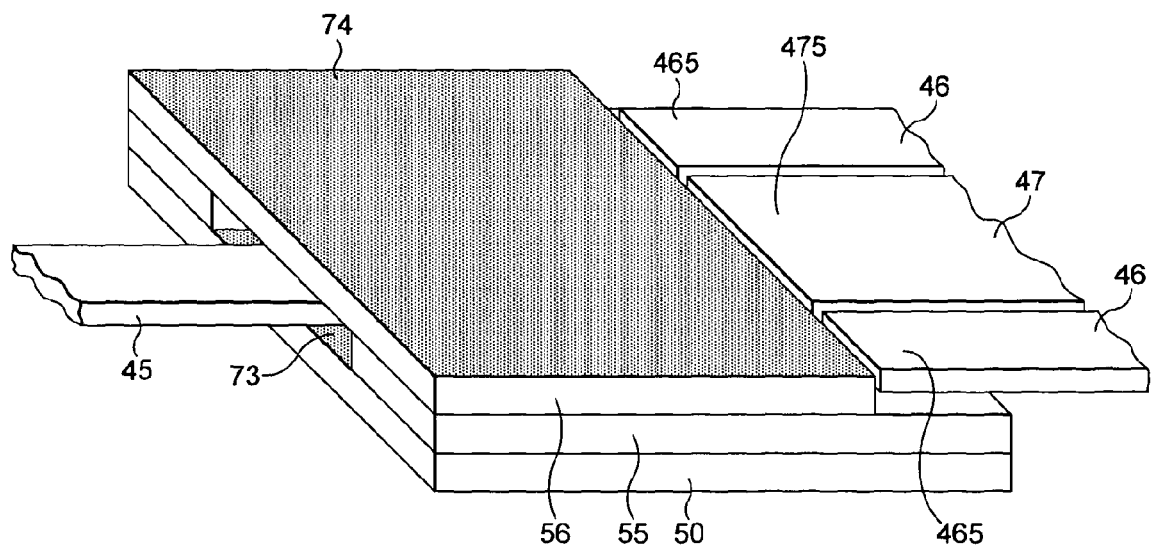
FIG. 23 is a diagrammatic perspective view of the partially-assembled heater mat of FIG. 22 at a subsequent stage of the alternative assembly process.

The next stage of the assembly process is shown in FIG. 23. In this stage, the partially-assembled heater mat of FIG. 22 has a further dielectric layer 56 positioned on top of the dielectric layer 55. Two connectors 46 (which corresponds to the two connectors 41 of the first embodiment) and a connector 47 (which corresponds to connector 42 of the first embodiment) have their ends 465, 475 brought into electrical contact with the terminals 5513. A second ground plane 74 is flame sprayed onto the dielectric layer 56 and has characteristics corresponding to the second ground plane 72 of the first embodiment. In FIG. 23, the dielectric layer 56 does not cover the ends 465, 475 of the connectors 46, 47. It could, alternatively, be arranged to cover the ends 465, 475 and this would, in the end product (the laminated heater mat of the second embodiment), result in slight localised increased thickness of the heater mat.

Figure 24:
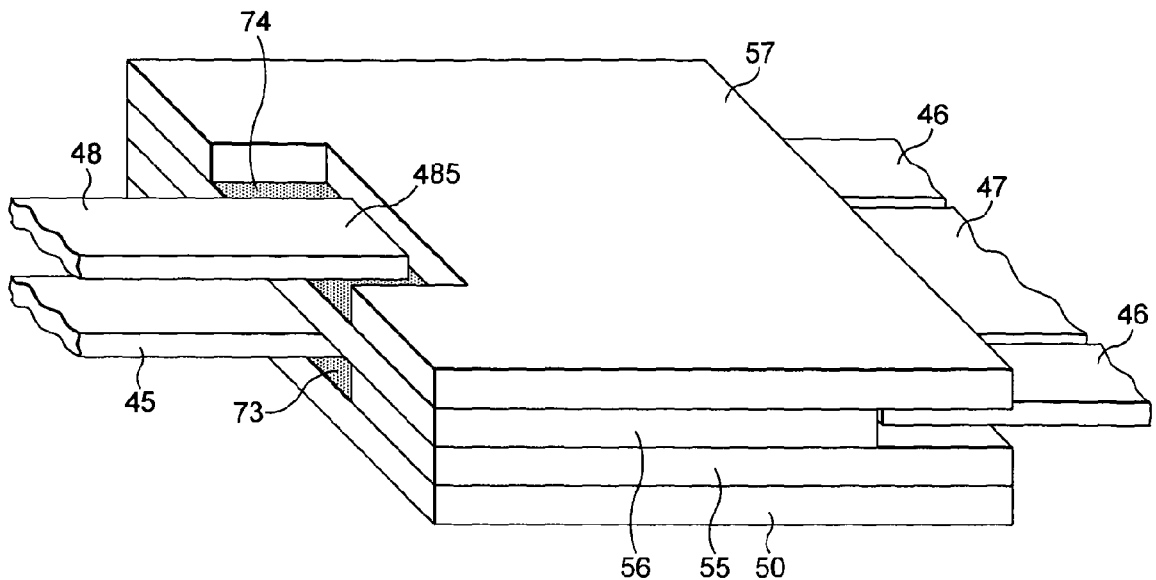
FIG. 24 is a diagrammatic perspective view of the partially-assembled heater mat of FIG. 23 at a subsequent stage of the alternative assembly process.

The next stage of the assembly process of the second embodiment is shown in FIG. 24. A dielectric layer 57 is positioned on top of the second ground plane 74. A connector 48 (which corresponds to the connector 44 of the first embodiment) has an end 485 electrically connected to the second ground plane 74. The dielectric layer 57 is shown as having a cutout around the end 485. This cutout could be omitted, and the dielectric layer 57 could extend over the end 485.

Figure 25:
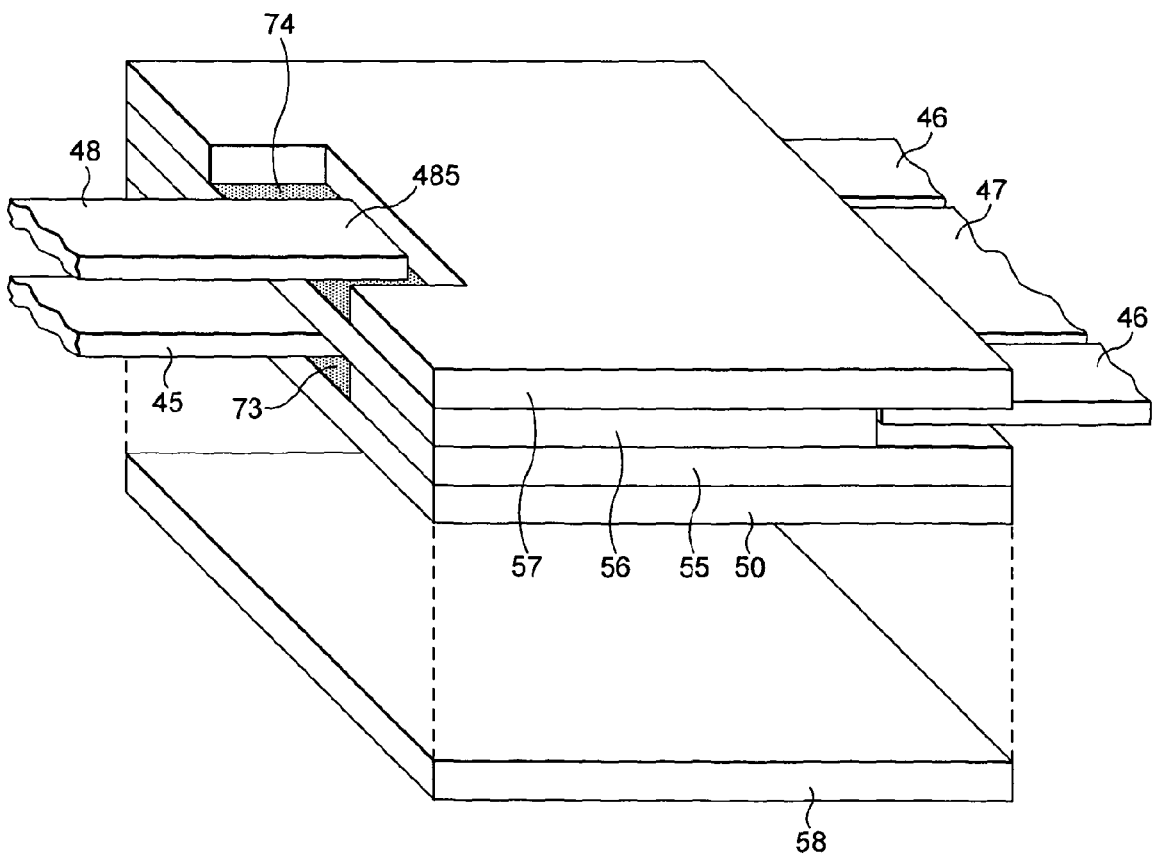
FIG. 25 is a diagrammatic perspective view of the partially-assembled heater mat of FIG. 24 at a subsequent stage of the alternative assembly process.
Figure 26:
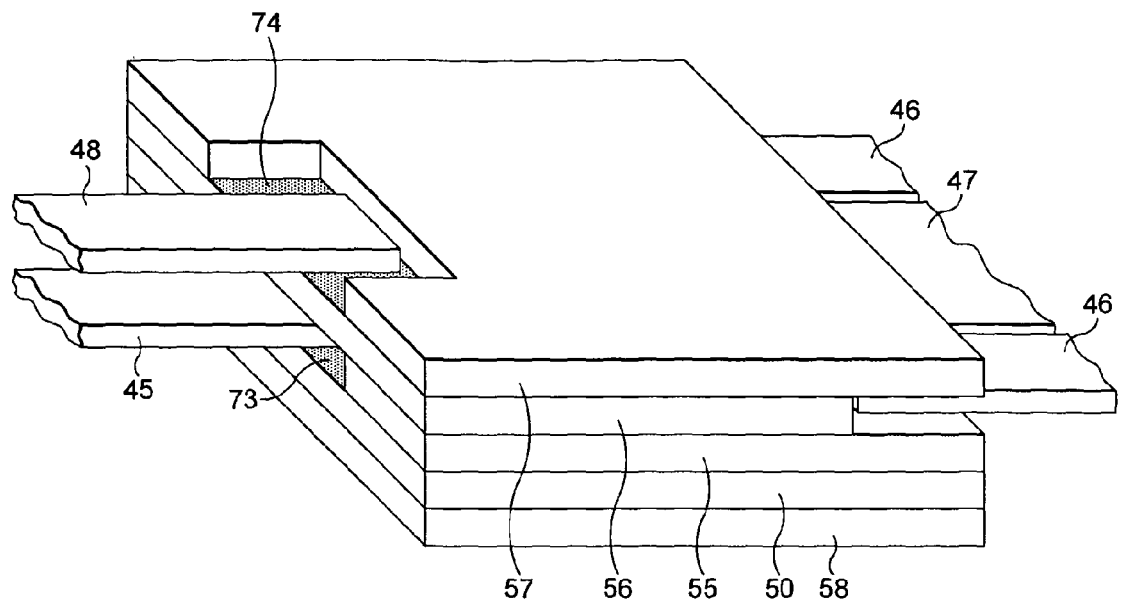
FIG. 26 is a diagrammatic perspective view of the partially-assembled heater mat of FIG. 25 at a subsequent stage of the alternative assembly process.

The next stage of the assembly process is shown in FIG. 25. A further dielectric layer 58 is brought into contact with the main surface 502 of the dielectric layer 50 so as to cover the heater element 501 and the area temperature sensor 507. The result is shown in FIG. 26. In FIG. 26, all of the components of the heater mat 3 and the embedded ends 455, 465, 475, 485 of the connectors 45, 46, 47, 48 are in position and ready to be laminated together.

Figure 27:
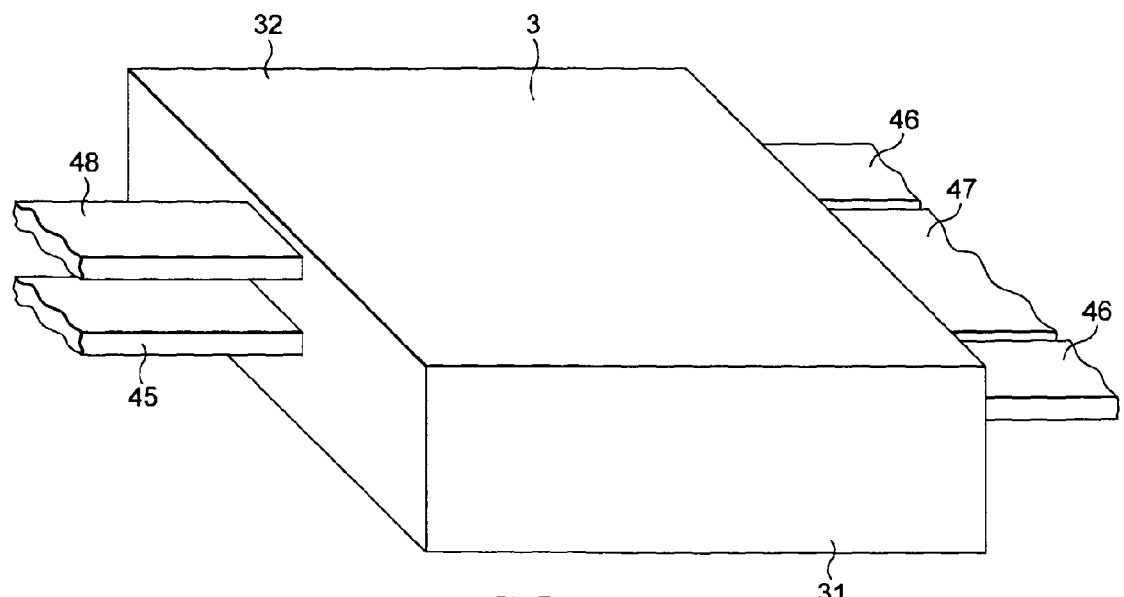
FIG. 27 is a diagrammatic perspective view of the heater mat of FIG. 26 after the components thereof have been laminated together.

Heat and pressure are applied to the stack of components of FIG. 26 to produce the monolithic laminate of the heater mat 3 shown in FIG. 27. All of the dielectric layers 50, 55, 56, 57, 58 are made of the same or compatible high-temperature engineering thermoplastic (as per the first embodiment) and thus fuse together during the lamination process. Where necessary, the thermoplastic material flows through the porous ground planes 73, 74 and through the porous heater element 501 and through the porous temperature sensor 507. Because the thermoplastic material merges or fuses together at the interfaces between the stacked components of FIG. 26, the interfaces substantially disappear and thus interface discontinuities are, in effect, not present in the end product (the heater mat 3 of the second embodiment). Discontinuities are undesirable because they can function as crack initiation sites which are sites of potential structural or fatigue weakness. Substantially removing discontinuities from the end product (the laminated heater mat 3) produces a more durable heater mat.

Figure 28:
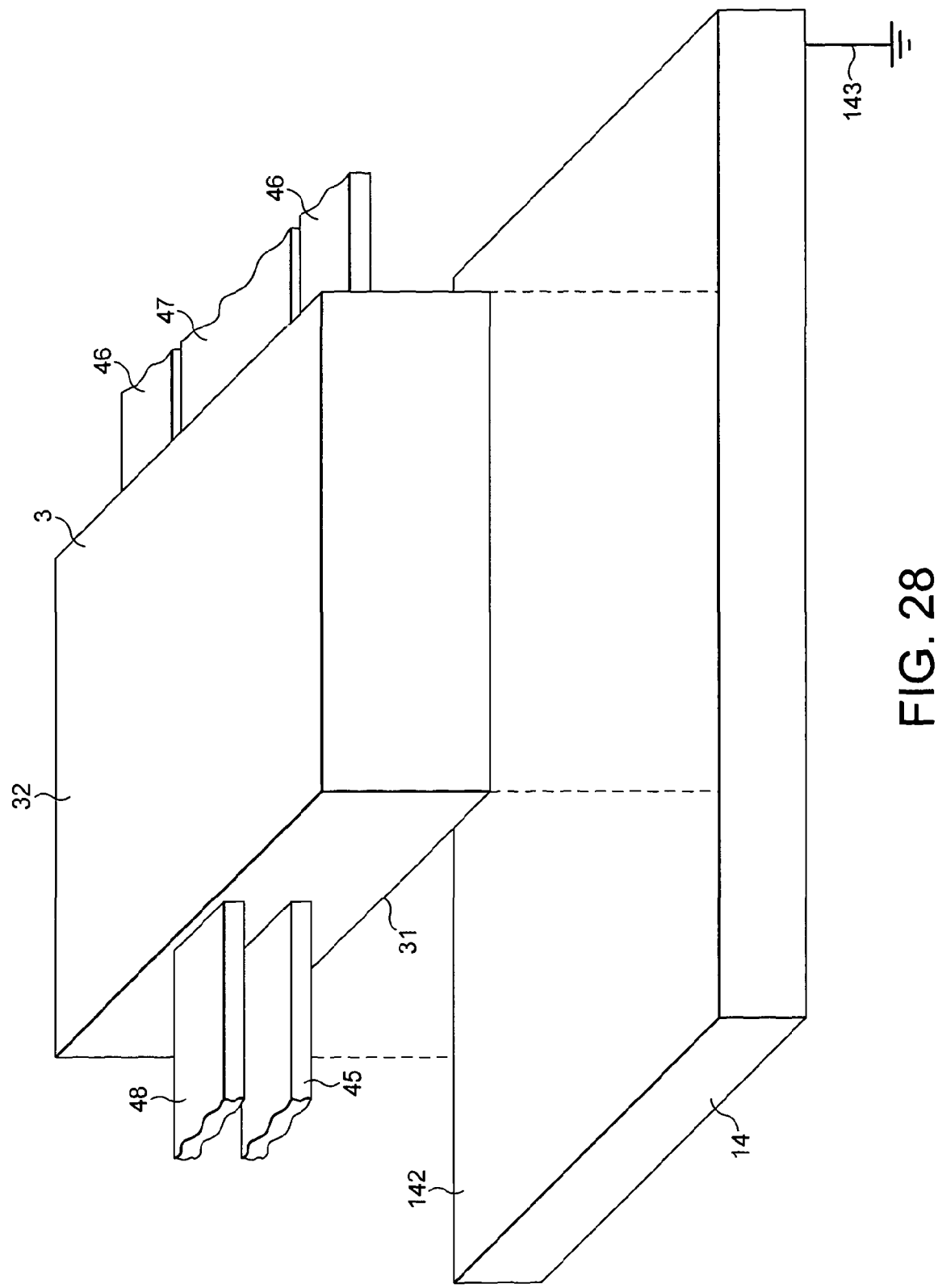
FIG. 28 is a diagrammatic perspective view showing the heater mat of FIG. 27 of the second embodiment of the present invention when being assembled to an erosion shield.

The heater mat 3 of the second embodiment (FIG. 27) then has its front surface 31 adhesively bonded to the rear surface 142 of the erosion shield 14, as shown in FIG. 28.

The connectors 45, 46, 47, 48 collectively form the bundle of connectors 4 which serve to electrically connect the heater mat 3 to the power supply and control electronics unit 6.

In the second embodiment, the two ground planes (ground planes 73, 74) have different positions relative to the heater element 501 and the temperature sensor 507 as compared with the two ground planes (ground planes 71, 72) of the first embodiment.

In the second embodiment, the heater element 501 and the temperature sensor 507 are not sandwiched between the two ground planes 73, 74. Instead, the two ground planes 73, 74 are positioned on the side of the heater element 501 and temperature sensor 507 remote from the erosion shield 14. In other words, the heater element 501 and the temperature sensor 507 are sandwiched between (i) the erosion shield 14 and (ii) the two ground planes 73, 74. Compared with a heater mat having only a single ground plane, the two ground planes 73, 74 of the second embodiment provide improved protection against a lightning strike inducing excessive currents in the heater element 501, the temperature sensor 507 and the embedded ends of the connection bundle 4 which lead away from the heater element 501 and the temperature sensor 507. However, the protection is less effective than the protection provided by the configuration of the two ground planes of the first embodiment, because in the first embodiment the two ground planes 71, 72 sandwich the heater element 501 and temperature sensor 507 and thus provide a type of "coaxial shielding" to the heater element 501 and temperature sensor 507.

Figure 29:
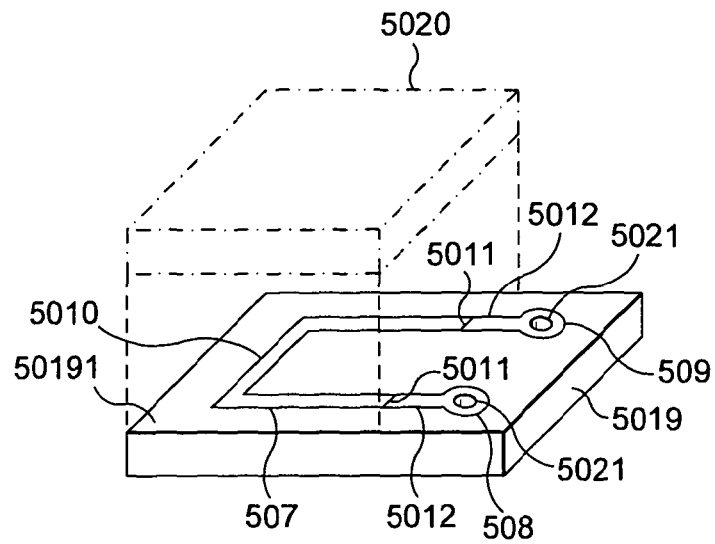
FIG. 29 is a diagrammatic perspective view of an alternative area temperature sensor.
Figure 30:
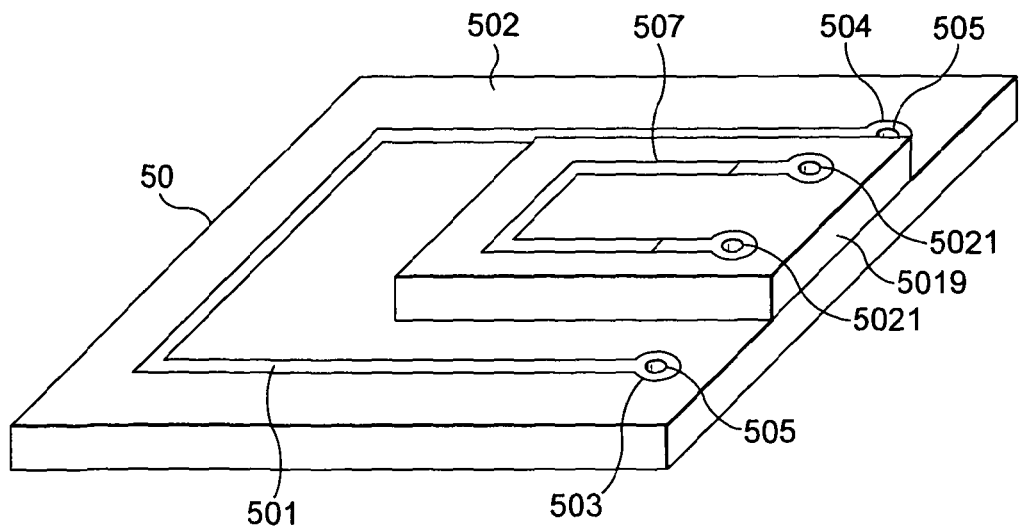
FIG. 30 is a diagrammatic perspective view of the area temperature sensor of FIG. 29 after being assembled onto the dielectric layer of FIG. 3.

FIGS. 29 and 30 show an alternative area temperature sensor. In FIG. 29, the area temperature sensor 507 is positioned on a carrier 5019 which is separate from the dielectric layer 50. The carrier 5019 is of smaller width and length than the dielectric layer 50 but is preferably made of the same high-temperature engineering thermoplastic as the dielectric layer 50. Alternatively but less desirably, the carrier 5019 is made of a high-temperature engineering thermoplastic which is compatible with the dielectric layer 50 and the other components of the heater mat 3 with which it will be fused during the lamination process. Our currently preferred materials for the carrier 5019 include PPS, PEI, PEKK, PEEK and PES. Of these materials, PEKK and PEEK are particularly preferred.

FIG. 29 also shows how the temperature sensor 507 may, optionally, be partially encapsulated within an encapsulation layer 5020 which is made of the same material as the carrier 5019. The encapsulation layer 5020 is shown in chain-dotted line in FIG. 29. When the encapsulation layer 5020 is positioned on the carrier 5019, the encapsulation layer 5020 covers all of the sensor head 5010 and the adjacent first parts of the leads 5012.

The area temperature sensor 507 is flame sprayed onto the upper main surface 50191 of the carrier 5019. The flame spraying of the temperature sensor 507 results in the first and second terminals 508, 509 of the temperature sensor being positioned around through holes 5021 of the carrier layer 5019.

Then, as shown in FIG. 30, the carrier 5019 is positioned on the dielectric layer 50 of FIG. 3. The positioning is such that the through holes 5021 of the carrier 5019 align with the relevant through holes 505 of the dielectric layer 50.

Other aspects of the manufacturing process for producing a heater mat are the same as for the first embodiment described with reference to FIGS. 3-19 or the second embodiment described with reference to FIGS. 20-28.

Figure 31:
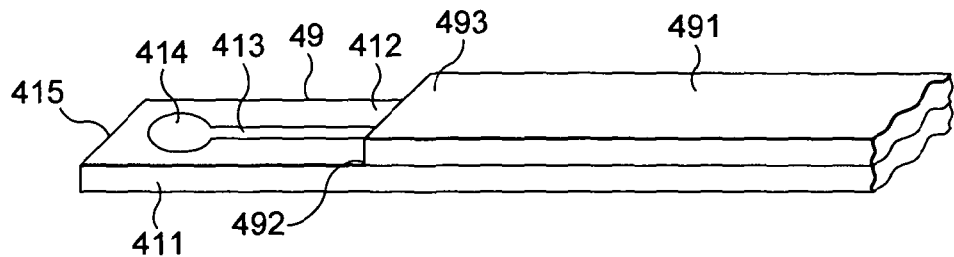
FIG. 31 is a diagrammatic perspective view of an alternative connector.

FIG. 31 shows a connector 49 which is a variant of the connector 41 of FIG. 8.

In relation to the connector 49, it uses the same dielectric substrate layer 411, main surface 412, power track 413, terminal 414 and end 415 as for the connector 41 of FIG. 8. The difference is that the connector 49 of FIG. 31 additionally includes an encapsulation layer 491 which is made of a high-temperature engineering thermoplastic the same as or compatible with the dielectric substrate layer 411. The encapsulation layer 491 stops at a position 492 of the main surface 412 which leaves exposed the terminal 414 and an adjacent short length of the power track 413. The connector 49 may be used to replace the connectors 41, 43 and 44 of the first embodiment or the connectors 45, 46 and 48 of the second embodiment. The position 492 of the connector 49 is chosen so that the end 493 of the encapsulation layer 491 butts up to, and does not enter into, the laminated components of the heater mat 3.

When the connector 49 is being produced, heat and pressure are applied to the layers 411, 491 so that they merge or fuse together to form a laminated structure.

However, because the encapsulation layer 491 does not penetrate into the laminated components of the heater mat 3, it would be possible to change the material of the encapsulation layer 491 to, for example, a protective film that is sprayed on. The nature of the material of the sprayed film will not particularly matter in the context of laminating together the components of the heater mat 3, because the material of the encapsulation layer 491 will not penetrate into the stack of components forming the heater mat 3.

Figure 32:
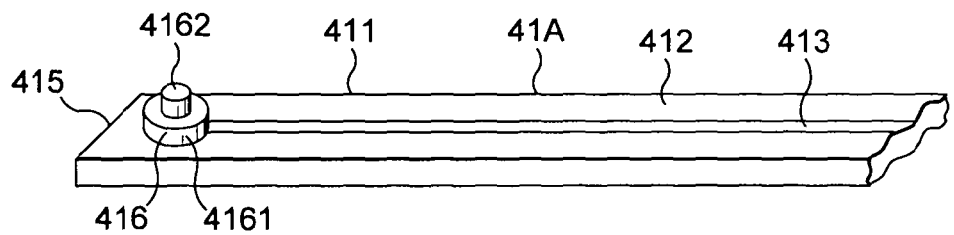
FIG. 32 is a diagrammatic perspective view of a further alternative connector.

FIG. 32 shows a further alternative connector 41A which is generally the same as the connector 41 of FIG. 8, except that a metallic (e.g. copper) plug 416 is attached (e.g. by welding or soldering) to the terminal 414 of FIG. 8, thereby to produce the connector 41A as a variant of the connector 41 of FIG. 8. The plug 416 is shown in FIG. 32 as having a circular base portion 4161 and a circular upper portion 4162 which is of smaller diameter than the base portion 4161. The diameter of the upper portion 4162 is preferably set to be the same as that of the holes 505 of FIG. 3. Thus, in a variant of FIG. 9, when the connector 41A replaces the connector 41, the upper portion 4162 of the plug 416 will project into and nest neatly inside the corresponding through hole 505 of the dielectric layer 50.

Figure 33:
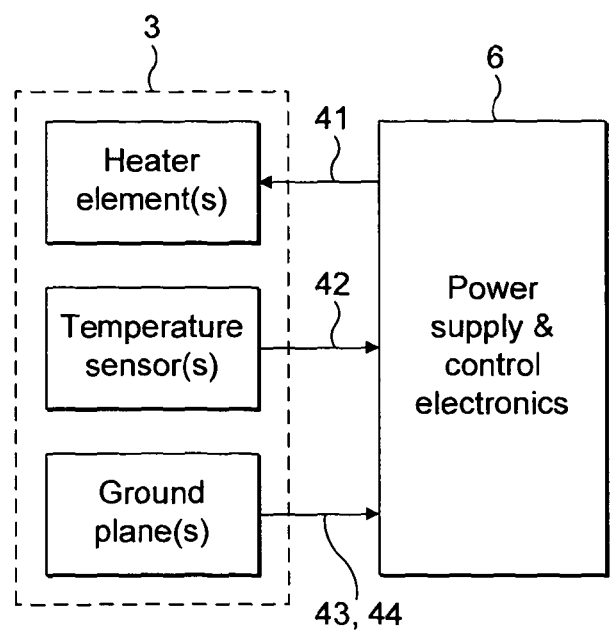
FIG. 33 is a schematic view showing the connections between a heater mat in accordance with the present invention and a power supply and control electronics unit of an aircraft.

FIG. 33 is a schematic depiction of the connections between the heater mat 3 and the power supply and control electronics unit 6.

The heater mat of the present invention may be incorporated in any (e.g. forwardly-facing) surface of an aircraft that may be prone to ice formation in flight. For example, alternatives to incorporating the heater mat in the leading edge of a wing include incorporating it in the leading edge of a fin or tailplane, or at the air intake of an engine, or in a trailing-edge flap to stop ice formation on the flap when it is deployed, or in an aileron.

In the above first and second embodiments, the heater mat 3 has been independently assembled and then laminated, before being attached to the erosion shield 14. An alternative would be to start with the erosion shield 14 and then stack in sequence, on the erosion shield, the components of the heater mat and the connectors. The first component could be bonded to the erosion shield. Then, when the full stack of components has been assembled onto the first component, heat and pressure could be applied to the components and the erosion shield so as to laminate together the components of the heater mat and the connectors in situ on the erosion shield.

There have been described first and second embodiments of an electrothermal heater 2 which are embodiments of electrical apparatus comprising a laminate 3 and a connector 41-49, wherein: the laminate 3 comprises dielectric layers 50-58 and an electrical element 501, 507, 71-74; each dielectric layer of the laminate comprises thermoplastic material; the connector comprises a ribbon 411, 421, 491 having first and second ends and a metal conductor 413, 423, 433; the first end 415, 425, 435, 445, 455, 465, 475, 485 of the ribbon comprises thermoplastic material, is embedded in the laminate and is laminated to adjacent first and second ones of the dielectric layers 50-58 of the laminate; the metal conductor of the connector is electrically connected to the electrical element of the laminate; the second end of the ribbon extends away from the laminate for connection to an electrical unit 6; the thermoplastic material of the first end of the ribbon is (i) the same as the thermoplastic material of the first dielectric layer of the laminate such that the thermoplastic material of the first end of the ribbon is dispersed or merged into the thermoplastic material of the first dielectric layer of the laminate or (ii) compatible with the thermoplastic material of the first dielectric layer of the laminate such that the thermoplastic material of the first end of the ribbon is fused to the thermoplastic material of the first dielectric layer of the laminate; and the thermoplastic material of the first end of the ribbon is (i) the same as the thermoplastic material of the second dielectric layer of the laminate such that the thermoplastic material of the first end of the ribbon is dispersed or merged into the thermoplastic material of the second dielectric layer of the laminate or (ii) compatible with the thermoplastic material of the second dielectric layer of the laminate such that the thermoplastic material of the first end of the ribbon is fused to the thermoplastic material of the second dielectric layer of the laminate.

There have also been described methods of manufacturing first and second embodiments of an electrothermal heater 2 which are examples of a method of manufacturing electrical apparatus, comprising the steps of: providing an electrical element 501, 507, 71-74 and a plurality of dielectric layers 50-58 each comprising thermoplastic material; flame spraying a metal track 413, 423, 433 onto thermoplastic material of a substrate layer 411, 421 of a connector 41-49; forming a stack comprising the dielectric layers, the electrical element and a first end 415, 425, 435, 445, 455, 465, 475, 485 of the substrate layer of the connector, with the first end of the substrate layer being positioned between first and second ones of the dielectric layers, a second end of the substrate layer being positioned outside the stack and the metal track of the connector being electrically connected to the electrical element; and laminating together the dielectric layers and the first end of the substrate layer such that the thermoplastic material of the first end of the substrate layer disperses or merges into or is fused to the thermoplastic material of the first dielectric layer and such that the thermoplastic material of the first end of the substrate layer disperses or merges into or is fused to the thermoplastic material of the second dielectric layer.

The invention claimed is:
1. Electrical apparatus comprising a laminate and a connector, wherein:
   the laminate comprises dielectric layers and an electrical element;
   each dielectric layer of the laminate comprises thermoplastic material;
   the connector comprises a ribbon having first and second ends and a metal conductor;

the first end of the ribbon comprises thermoplastic material, is embedded in the laminate and is laminated to adjacent first and second ones of the dielectric layers of the laminate;

the metal conductor of the connector is electrically connected to the electrical element of the laminate;

the second end of the ribbon extends away from the laminate for connection to an electrical unit;

the thermoplastic material of the first end of the ribbon is (i) the same as the thermoplastic material of the first dielectric layer of the laminate such that the thermoplastic material of the first end of the ribbon is dispersed or merged into the thermoplastic material of the first dielectric layer of the laminate or (ii) compatible with the thermoplastic material of the first dielectric layer of the laminate such that the thermoplastic material of the first end of the ribbon is fused to the thermoplastic material of the first dielectric layer of the laminate; and the thermoplastic material of the first end of the ribbon is (i) the same as the thermoplastic material of the second dielectric layer of the laminate such that the thermoplastic material of the first end of the ribbon is dispersed or merged into the thermoplastic material of the second dielectric layer of the laminate or (ii) compatible with the thermoplastic material of the second dielectric layer of the laminate such that the thermoplastic material of the first end of the ribbon is fused to the thermoplastic material of the second dielectric layer of the laminate;

wherein the ribbon comprises a substrate layer, the first end of the ribbon is provided by a first end of the substrate layer and the substrate layer extends from the end to the second end of the ribbon.

2. Electrical apparatus according to claim 1, wherein the ribbon further comprises an encapsulation layer and the conductor is sandwiched between the substrate layer and the encapsulation layer.

3. Electrical apparatus according to claim 2, wherein the encapsulation layer does not cover the first end of the substrate layer.

4. Electrical apparatus according to claim 2, wherein the encapsulation layer comprises the same thermoplastic material as the substrate layer and is laminated to the substrate layer.

5. Electrical apparatus according to claim 1, wherein the embedded first end of the ribbon covers 10% or less of a main surface of the first or second dielectric layer onto which the first end of the ribbon is laminated.

6. Electrical apparatus according to claim 1, wherein the metal conductor of the connector is a sprayed metal track.

7. Electrical apparatus according to claim 6, wherein the sprayed metal track is porous.

8. Electrical apparatus according to claim 6, wherein the sprayed metal track includes a terminal at the first end of the ribbon and the electrical element of the laminate includes a terminal which is in electrical contact with the terminal at the first end of the ribbon.

9. Electrical apparatus according to claim 6, wherein a metal plug is attached to the sprayed metal track at the first end of the ribbon and the metal plug protrudes into a hole in the first or second dielectric layer of the laminate and is electrically connected to the electrical element.

10. Electrical apparatus according to claim 1, wherein the connector comprises a plurality of said metal conductors.

11. Electrical apparatus according to claim 1, wherein the or each thermoplastic material comprises PEEK, PEKK, PPS, PEI or PES or a mixture thereof.

12. Electrical apparatus according to claim 1, wherein the or each thermoplastic material comprises PEEK, PEKK or a mixture thereof.

13. Electrical apparatus according to any preceding claim, wherein the thermoplastic material of the first end of the ribbon is the same as the thermoplastic material of the dielectric layers.

14. Electrical apparatus according to claim 1, wherein:
the electrical apparatus comprises a plurality of said connectors and the laminate comprises a plurality of said electrical elements; and
each electrical element is electrically connected to the metal conductor(s) of the or each of a respective one or plurality of the connectors.

15. Electrical apparatus according to claim 1, wherein the laminate is a heater mat for an ice protection system and the electrical element or at least one of the electrical elements is a heater element.

16. An electrothermal ice protection system comprising electrical apparatus according to claim 15 and a heater control unit to which the second end of the ribbon of the connector or at least one of the connectors is connected.

17. Ice protected apparatus comprising an external skin and electrical apparatus according to claim 15, wherein the heater mat is in thermal contact with a rear surface of the external skin.

18. A nose skin comprising an erosion shield and electrical apparatus according to claim 15, wherein the heater mat is bonded to a rear surface of the erosion shield.

19. A wing slat comprising a rear section and a forward section comprising a nose skin according to claim 18.

20. A wing slat according to claim 19, wherein the nose skin is demountable from the rear section.

21. A method of manufacturing electrical apparatus, comprising the steps of:
providing an electrical element and a plurality of dielectric layers each comprising thermoplastic material;
flame spraying a metal track onto thermoplastic material of a substrate layer of a connector;
forming a stack comprising the dielectric layers, the electrical element and a first end of the substrate layer of the connector, with the first end of the substrate layer being positioned between first and second ones of the dielectric layers, a second end of the substrate layer being positioned outside the stack and the metal track of the connector being electrically connected to the electrical element; and
laminating together the dielectric layers and the first end of the substrate layer such that the thermoplastic material of the first end of the substrate layer disperses or merges into or is fused to the thermoplastic material of the first dielectric layer and such that the thermoplastic material of the first end of the substrate layer disperses or merges into or is fused to the thermoplastic material of the second dielectric layer.

22. A method according to claim 21, wherein the electrical element is a heater element and the method further comprises the step of flame spraying the heater element onto the thermoplastic material of one of the dielectric layers.

23. A method according to claim 21, wherein the electrical element is a temperature sensor and the method further comprises the step of flame spraying the temperature sensor onto the thermoplastic material of one of the dielectric layers.

24. A method according to claim 21, wherein the electrical element is a conductive ground plane and the method further comprises the step of flame spraying the ground plane onto the thermoplastic material of one of the dielectric layers.

25. A method according to claim 21, wherein the or each thermoplastic material comprises PEEK, PEKK, PPS, PEI or PES or a mixture thereof.

26. A method according to claim 21, wherein the or each thermoplastic material comprises PEEK, PEKK or a mixture thereof.

27. A method according to claim 21, wherein the thermoplastic material of the substrate layer is the same as the thermoplastic material of the dielectric layers.

* * * * *

UNITED STATES PATENT AND TRADEMARK OFFICE
CERTIFICATE OF CORRECTION

| | | |
|---|---|---|
| PATENT NO. | : 8,981,266 B2 | Page 1 of 1 |
| APPLICATION NO. | : 13/575892 | |
| DATED | : March 17, 2015 | |
| INVENTOR(S) | : Stuart Martin Lewis et al. | |

It is certified that error appears in the above-identified patent and that said Letters Patent is hereby corrected as shown below:

In the Claims

Column 19, line 32, replace "the end" with -- the first end --.

Signed and Sealed this
Fifteenth Day of September, 2015

Michelle K. Lee
*Director of the United States Patent and Trademark Office*